US011824396B2

(12) United States Patent
Jia

(10) Patent No.: US 11,824,396 B2
(45) Date of Patent: Nov. 21, 2023

(54) WIRELESS CHARGING METHOD, ELECTRONIC DEVICE AND WIRELESS CHARGING APPARATUS

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 371 days.

(21) Appl. No.: 17/193,535

(22) Filed: Mar. 5, 2021

(65) Prior Publication Data

US 2021/0194268 A1 Jun. 24, 2021

Related U.S. Application Data

(63) Continuation of application No. PCT/CN2019/096408, filed on Jul. 17, 2019.

(30) Foreign Application Priority Data

Sep. 30, 2018 (CN) .......................... 201811154730.1

(51) Int. Cl.
*H02J 50/80* (2016.01)
*H02J 50/10* (2016.01)
(Continued)

(52) U.S. Cl.
CPC ............... *H02J 7/02* (2013.01); *H01M 10/44* (2013.01); *H01M 10/48* (2013.01);
(Continued)

(58) Field of Classification Search
CPC ..................................................... H02J 70/80
(Continued)

(56) References Cited

U.S. PATENT DOCUMENTS

2017/0366091 A1* 12/2017 Langeslag ......... H02M 3/33523
2018/0226829 A1* 8/2018 Bae ........................... H02J 7/02

FOREIGN PATENT DOCUMENTS

| CN | 102222967 A | 10/2011 |
|---|---|---|
| CN | 105072785 A | 11/2015 |

(Continued)

OTHER PUBLICATIONS

International Search Report with English Translation for PCT/CN2019/096408 dated Oct. 10, 2019.
(Continued)

*Primary Examiner* — Edward Tso
*Assistant Examiner* — Ahmed H Omar
(74) *Attorney, Agent, or Firm* — Young Basile Hanlon & MacFarlane, P.C.

(57) ABSTRACT

Provided are a wireless charging method, an electronic device and a wireless charging apparatus. The method includes: monitoring a present voltage of a battery of the electronic device, after communication between a wireless charging apparatus and an electronic device is established; in response to the present voltage of the battery being greater than a preset fast charging voltage, controlling a voltage and current adjusting module of the electronic device to operate, to perform step-down and current rising on a direct current power outputted by the wireless receiving module of the electronic device and provide the direct current power after the step-down and current rising to the battery; determining an initial voltage value and sending the initial voltage value to the wireless charging apparatus, to enable the wireless charging apparatus to control a voltage of an adjustable direct current power according to the initial voltage value.

14 Claims, 9 Drawing Sheets

(51) Int. Cl.
  *H02J 7/02*     (2016.01)
  *H02J 7/00*     (2006.01)
  *H01M 10/44*    (2006.01)
  *H01M 10/48*    (2006.01)
  *H02M 3/07*     (2006.01)

(52) U.S. Cl.
  CPC ........ *H02J 7/00036* (2020.01); *H02J 7/0047* (2013.01); *H02J 50/10* (2016.02); *H02J 50/80* (2016.02); *H02J 2207/20* (2020.01); *H02M 3/07* (2013.01)

(58) Field of Classification Search
  USPC .......................................................... 320/108
  See application file for complete search history.

(56) References Cited

FOREIGN PATENT DOCUMENTS

| | | | |
|---|---|---|---|
| CN | 107947305 A | | 4/2018 |
| CN | 108199438 A | | 6/2018 |
| CN | 108233453 A | | 6/2018 |
| CN | 108233454 A | * | 6/2018 |
| CN | 108233454 A | | 6/2018 |
| CN | 109148990 A | | 1/2019 |
| EP | 3285353 A1 | | 2/2018 |
| EP | 3304688 A1 | | 4/2018 |
| KR | 101470364 B1 | | 12/2014 |

OTHER PUBLICATIONS

Notice of Allowance with English Translation for OA for CN application 201811154730.1 dated Sep. 3, 2020.

First Examination with English Translation for CN application 201811154730.1 dated Oct. 28, 2019.

Extended European Search Report for EP Application 19864841.2 dated Sep. 17, 2021. (14 pages).

* cited by examiner

WIRELESS CHARGING METHOD, ELECTRONIC DEVICE AND WIRELESS CHARGING APPARATUS

CROSS-REFERENCE TO RELATED APPLICATION(S)

This application is a continuation application of International Application No. PCT/CN2019/096408, filed on Jul. 17, 2019, which claims priority from Chinese Patent Application No. 201811154730.1, filed on Sep. 30, 2018, the entire contents of both of which are incorporated herein by reference.

TECHNICAL FIELD

The present disclosure relates to a field of charging technologies, and more particularly, to a wireless charging method, an electronic device and a wireless charging apparatus.

BACKGROUND

Wireless charging technologies in related technologies usually employ a structure as illustrated in FIG. 16. For the charging structure, a transmitting terminal steadily outputs voltage, and a specific charging process may be adjusted and controlled by a Buck Charge 10. However, the related technologies have some problems of relatively low efficiency, relatively lot heating, and only be charging with low power, for example 10 W. Increasing of the power may cause very serious heat and affect user experiences.

SUMMARY

In a first aspect of the disclosure, a wireless charging method is provided. The wireless charging method is applicable to an electronic device. The electronic device is configured to receive by a wireless receiving module, an electromagnetic signal transmitted by a wireless charging apparatus and to convert the electromagnetic signal to a direct current power. And the method includes: monitoring a present voltage of a battery of the electronic device, after communication between the wireless charging apparatus and the electronic device is established; in response to the present voltage of the battery being greater than a preset fast charging voltage, controlling a voltage and current adjusting module of the electronic device to operate, to perform step-down and current rising on the direct current power outputted by the wireless receiving module of the electronic device and to provide the direct current power after the step-down and current rising to the battery; determining an initial voltage value of an adjustable direct current power and sending the initial voltage value to the wireless charging apparatus, to enable the wireless charging apparatus control a voltage of the adjustable direct current power inputted into a wireless transmitting module according to the initial voltage value.

In a second aspect of the disclosure, an electronic device is provided. The electronic device includes: a battery; a wireless receiving module, configured to receive an electromagnetic signal transmitted by a wireless charging apparatus, and to convert the electromagnetic signal to a direct current power; a voltage and current adjusting module, coupled to the wireless receiving module and the battery respectively, and configured to perform step-down and current rising on the direct current power and to provide the direct current power after the step-down and current rising to the battery; a first communication module, configured to perform wireless communication with the wireless charging apparatus; a first controller, coupled to the first communication module and the voltage and current adjusting module respectively, and configured to monitor a present voltage of a battery, after communication between the wireless charging apparatus and the electronic device is established, control the voltage and current adjusting module to operate, to perform step-down and current rising on the direct current power outputted by the wireless receiving module in response to the present voltage of the battery being greater than a preset fast charging voltage, and determine an initial voltage value of an adjustable direct current power and send the initial voltage value to the wireless charging apparatus through the first communication module, to enable the wireless charging apparatus to control a voltage of the adjustable direct current power inputted into a wireless transmitting module according to the initial voltage value.

In a third aspect of the disclosure, a wireless charging apparatus is provided. The wireless charging apparatus includes: a voltage conversion module, configured to perform conversion on an input electrical signal to output an adjustable direct current power; a wireless transmitting module, coupled to the voltage conversion module, and configured to convert the adjustable direct current power to an electromagnetic signal and transmit the electromagnetic signal in a wireless manner; a second communication module, communicated with an electronic device; a second controller, coupled to the second communication module and the voltage conversion module correspondingly, and configured to receive control information sent by the electronic device through the second communication module, and control the voltage conversion module according to the control information to match the voltage of the adjustable direct current power with the control information. The control information comprises an initial voltage value of the adjustable direct current power, or a step-up adjustment instruction of the adjustable direct current power, or, a step-down adjustment instruction of the adjustable direct current power.

BRIEF DESCRIPTION OF DRAWINGS

The above and/or additional aspects and advantages of the disclosure will become more apparent and be understood more easily with reference to accompanying drawings and descriptions for implementations, in which.

DETAILED DESCRIPTION

Figure 1:
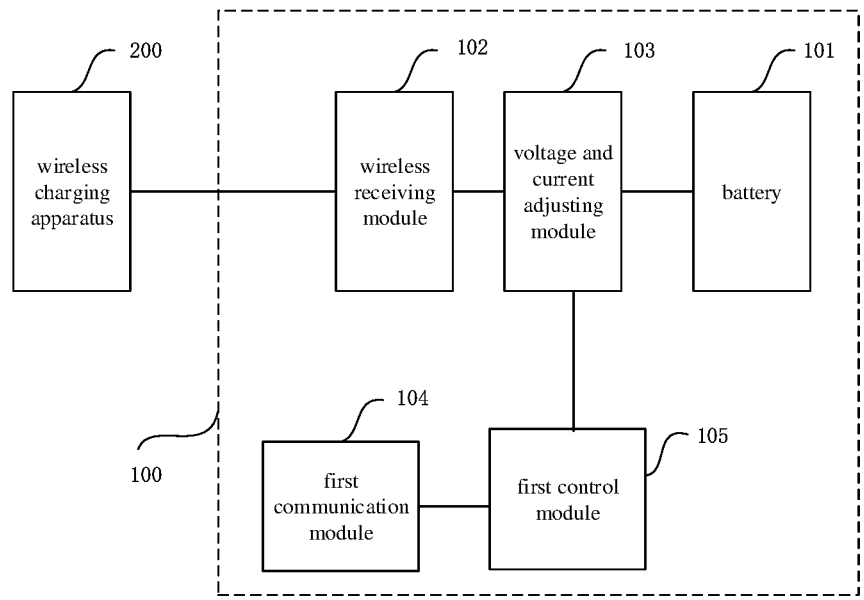
FIG. 1 is a block diagram illustrated an electronic device according to embodiments of the present disclosure.
Figure 2:
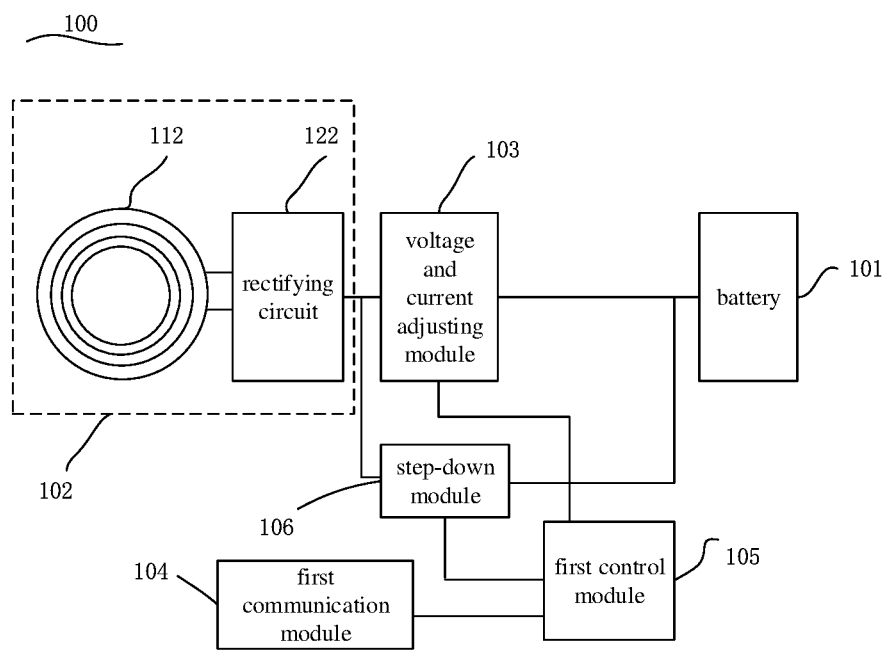
FIG. 2 is a block diagram illustrated an electronic device according to an embodiment of the present disclosure.

Description will be made in detail below to embodiments of the disclosure. Examples of those embodiments are illustrated in accompanying drawings. Same or similar reference numerals refer to same or similar elements or elements having same or similar functions throughout. The embodiments described below with reference to the accompanying drawings are exemplary and are intended to explain the disclosure, and should not be construed as a limitation of the disclosure.

A wireless charging method, an electronic device, a wireless charging apparatus and a wireless charging system in embodiments of the present disclosure will be described below with reference to drawings.

It may be noted that the wireless charging method of the embodiments of the present disclosure may be applied for a wireless charging structure with a voltage and current adjusting module. For example, the voltage and current adjusting module may be a charge pump module. For a wireless charging structure with a charge pump, the charge pump module is provided in the electronic device to utilize the charge pump module to realize step-down and current rising. The electronic device may be a mobile phone, a tablet computer, a smart watch, etc.

It should be understood that for Buck circuits, the greater a difference between an input voltage and an output voltage, the lower conversion efficiency. For example, when a Buck IC has an input voltage of 15V and an output voltage of 4.2V, the efficiency is about 75%, but when the same Buck IC has the input voltage of 5V and the output voltage of 4.2V, the efficiency may reach 96%.

For the voltage and current adjusting module such as the charge pump, its own efficiency is relatively high. For example, for a charge pump having a conversion factor 3, the efficiency is about 95%. Therefore, using the charge pump may improve charging efficiency, and improve charging speed, and realize wirelessly fast charging.

Referring to FIGS. 1-4, an electronic device 100 of embodiments of the present disclosure includes a battery 101, a wireless receiving module 102, a voltage and current adjusting module 103, a first communication module 104 and a first controller 105.

The wireless receiving module 102 is configured to receive an electromagnetic signal transmitted by a wireless charging apparatus 200, and convert the electromagnetic signal to a direct current power. The wireless charging apparatus 200 may transmit the electromagnetic signal according to a voltage of an adjustable direct current power. In some embodiments, the wireless receiving module 102 is configured to convert the electromagnetic signal transmitted by a wireless transmitting module of the wireless charging apparatus 200 to an alternating current power through a receiving coil 112, and to perform operations such as rectifying and/or filtering on the alternating current power, to convert the alternating current power into a stable direct current power to charge the battery 101.

In some embodiments, the wireless receiving module 102 includes a rectifying circuit 122. The rectifying circuit 122 is configured to convert the alternating current power received by the receiving coil 112 into the direct current power.

According to an embodiment of the present disclosure, the battery 101 may include a single cell or multiple cells. For example, when the battery 101 includes the multiple cells, the multiple cells are coupled in series. Therefore, a tolerable charging voltage of the battery 101 may be a sum of tolerable charging voltages of the multiple cells, thereby increasing charging speed and reducing charging heat.

Taking the electronic device being a mobile phone as an example, when the battery 101 of the electronic device includes the single cell, a voltage of the internal single cell is generally between 3.0V-4.35V. When the battery 101 of the electronic device includes two battery cells coupled in series, a total voltage of the two cells coupled in series is 6.0V-8.7V. Therefore, output voltage of the wireless receiving module 102 may be increased when the multiple cells are coupled in series, compared with the single cell. Compared with the single cell, the charging current required by the multiple cells is about 1/S of the charging current required by the single cell (S is the number of the cells connected in series in the electronic device) under the same charging speed. In other words, under a premise of ensuring the same charging speed (same charging power), a multiple cells solution may reduce the charging current, thereby reducing heat generated by the electronic device during the charging process. Otherwise, compared with a solution of the single cell, a solution of the multiple cells may increase the charging voltage and the charging speed under the condition of the same charging current.

The voltage and current adjusting module 103 is coupled to the wireless receiving module 102 and the battery 101 respectively. For example, an input terminal of the voltage and current adjusting module 103 is coupled to the wireless receiving module 102, and an output terminal of the voltage and current adjusting module 103 is coupled to the battery 101. The voltage and current adjusting module 103 is configured to perform step-down and current rising on the direct current power and provide the direct current power after the step-down and current rising to the battery 101. In some examples, the voltage and current adjusting module 103 may perform step-down and current rising on the direct current power outputted by the wireless receiving module 102 to obtain a direct current power corresponding to a charging requirement of the battery 101. That is, a voltage value and a current value of the direct current power outputted by the voltage and current adjusting module 103 correspond to the charging requirement of the battery 101 and may be directly supplied to the battery 101 to charge the battery 101.

In embodiments of the present disclosure, a conversion factor N of the voltage and current adjustment module 103 may be preset according to actual conditions. In some examples, the conversion factor N may be 2, 3, 4, etc. For the voltage and current adjusting module 103 having the conversion factor N, an output voltage is 1/N of an input voltage, and an output current is N times of an input current. Therefore, high-power wireless charging may be realized through a suitable conversion factor. For example, a charge pump module having the conversion factor 3 may easily realize higher power fast charge, and a charge pump module having the conversion factor 2 may realize a fast charge with a power of about 12 W. In the embodiment of the present disclosure, the charge pump module having the conversion factor 3 is preferable.

Figure 5:
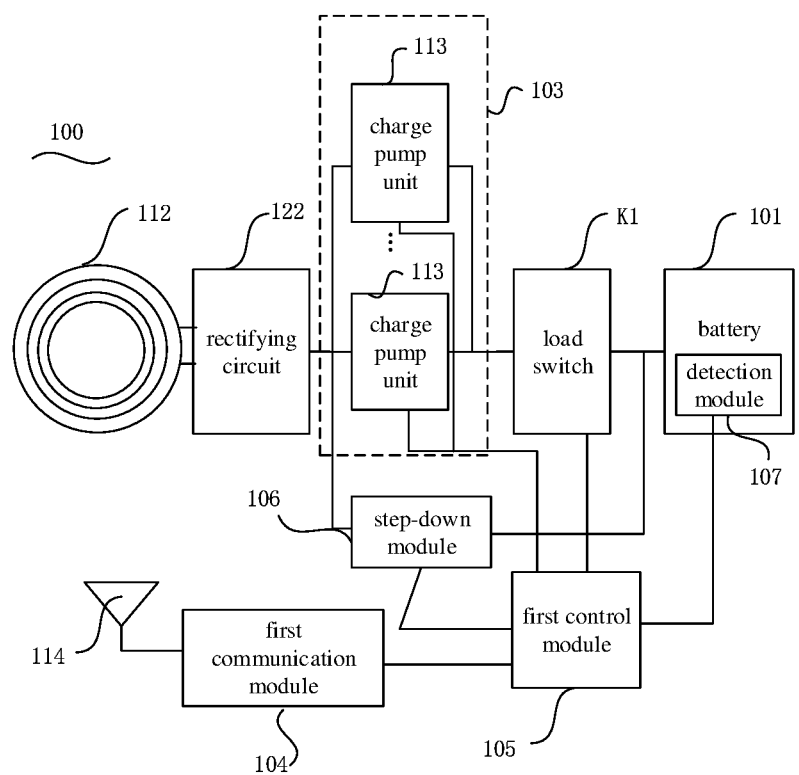
FIG. 5 is a block diagram illustrated structure of an electronic device according to yet another embodiment of the present disclosure, in which communication is performed through an antenna.
Figure 6:
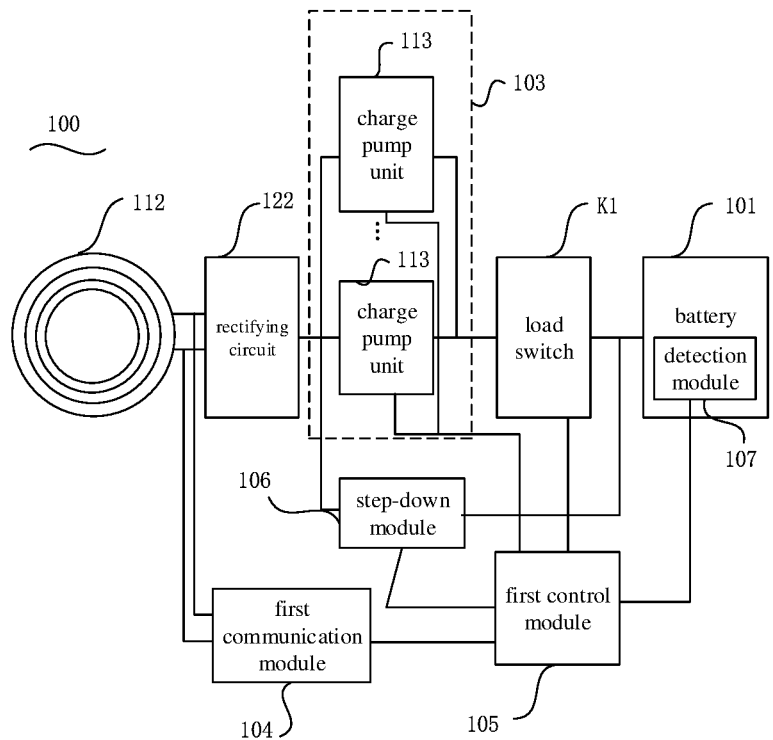
FIG. 6 is a block diagram illustrated structure of an electronic device according to yet another embodiment of the present disclosure, in which communication is performed through a receiving coil.

The voltage and current adjusting module 103 includes at least one charge pump unit 113, and the least one charge pump unit 113 may be coupled in parallel or in series. For example, as illustrated in FIGS. 5-6, the voltage and current adjusting module 103 includes multiple charge pump units 113. Multiple charge pump units 113 may be coupled in parallel to improve the charging power. For another example, the voltage and current adjustment module 103 includes multiple charge pump units 113, and multiple charge pump units 113 may be coupled in series, thereby increasing the conversion factor of the voltage and current adjustment module 103. With increasing the conversion factor of the voltage and current adjustment module 103, higher voltage charging may be realized, charging efficiency and charging speed may be improved. For example, two charge pump units 113 having the conversion factor 3 may be coupled in series to achieve a conversion factor 9. When the voltage of the battery 101 is 4V, the wireless charging apparatus provides high voltage charging of about 36V.

Figure 3:
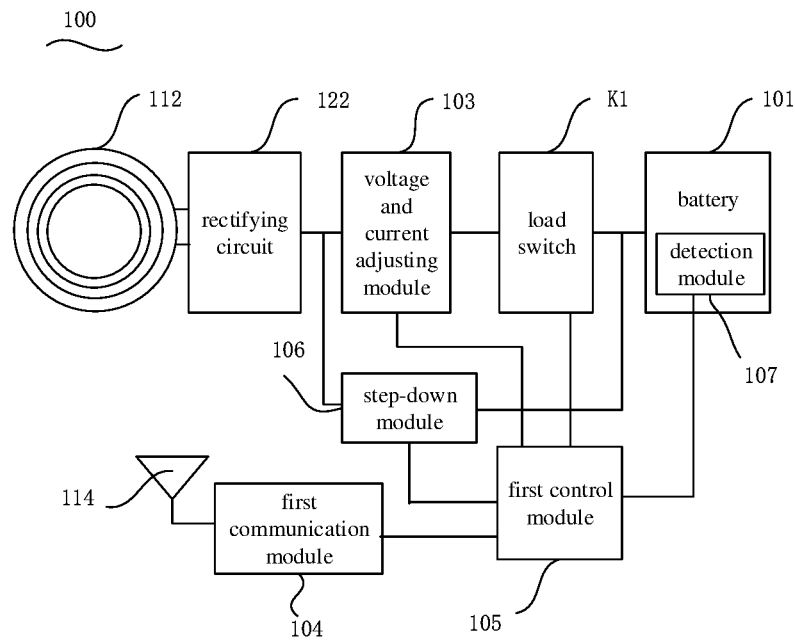
FIG. 3 is a block diagram illustrated structure of an electronic device according to another embodiment of the present disclosure, in which communication is performed through an antenna.
Figure 4:
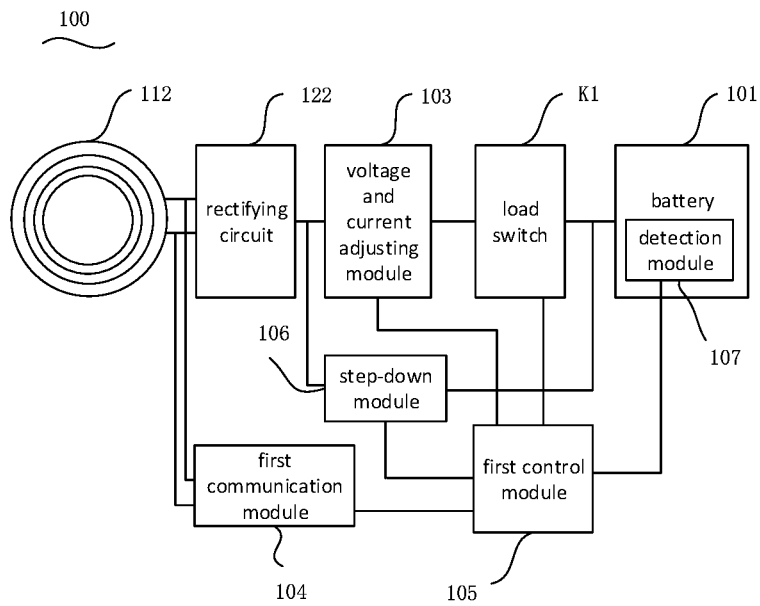
FIG. 4 is a block diagram illustrated structure of an electronic device according to another embodiment of the present disclosure, in which communication is performed through a receiving coil.

The first communication module 104 is configured to perform wireless communication with the wireless charging apparatus 200. The first communication module 104 may implement the wireless communication by multiple manners. For example, the first communication module 104 may implement the communication by Bluetooth, Wi-Fi or other manners. Under these types of communication manners, as illustrated in FIG. 3 and FIG. 5, the first communication module 104 may wirelessly communicate with the wireless charging apparatus 200 through a separate antenna 114, or wirelessly communicate with the wireless charging apparatus 200 through sharing the antenna 114 of electronic device 100. The antenna 114 may be a Bluetooth antenna, a Wi-Fi antenna, or an antenna applicable for other communication manners. For another example, the first communication module 104 may implement the communication by a signal coupling manner. As illustrated in FIG. 4 and FIG. 6, the first communication module 104 may share the receiving coil 112 and modulate a communication signal onto the receiving coil 112 for communication.

Further, referring to FIGS. 2-6, the electronic device 100 according to embodiments of the present disclosure may include a step-down module 106 coupled in parallel with the voltage and current adjusting module 103. An input terminal of the step-down module 106 is coupled to an output terminal of the rectifying circuit, and an output terminal of the step-down module 106 is coupled to the battery 101. The step-down module 106 is configured to perform step-down on the direct current power, and provide a stepped down direct current power to the battery 101. In some examples, the step-down module 106 may perform step-down on the direct current power outputted by the wireless receiving module 102 and obtain the direct current power corresponding to the charging requirement of the battery 101. That is, the voltage and the current of the direct current power output by the step-down module 106 correspond to the charging requirement of the battery 101, and may be directly supplied to the battery 101 to charge the battery 101.

In the embodiment of the present disclosure, the step-down module 106 may be implemented by multiple kinds of forms. For example, the step-down module 106 may be a buck circuit. For the buck circuit, the greater the difference between an input voltage and an output voltage, the lower the conversion efficiency. For example, when an input voltage of the buck circuit is 5V and an output voltage of the Buck circuit is 4.2V, efficiency may reach 96%, and heat of the buck circuit is reduced.

In embodiments of the present disclosure, the first controller 105 may control the entirely wireless charging process. As an example, the first controller 105 may control the step-down module 106 to turn off and control the voltage and current adjusting module 103 to start operating to charge the battery 101 through the voltage and current adjusting module 103 in a fast charging scenario, such as a constant current (CC) stage and an earlier section of a constant voltage (CV) stage. The first controller 105 may also control the voltage and current adjusting module 103 to turn off and control the step-down module 106 to start operating to charge the battery 101 through the step-down module 106 in a pre-charging scenario and a trickle charging scenario.

Specifically, taking the voltage and current adjusting module 103 being the charge pump module as an example, a charging loop of the electronic device 100 may be formed by the receiving coil 112, the rectifying circuit 122, the charge pump module, and the battery 101 sequentially coupled in series. The receiving coil 112 is configured to receive the alternating current power through electromagnetic induction or electromagnetic resonance, and the rectifying circuit 122 is configured to convert the alternating current power received by the receiving coil 112 into the direct current power, and then input the direct current power into the charge pump module to perform the step-down and current raising. The direct current power performed the step-down and current raising through the charge pump module is employed to charge the battery 101.

Therefore, with realizing the wireless charging based on the structure having the above-mentioned charge pump module, heat loss during the charging process may be reduced and the overall charging efficiency may be improved, more particularly, to efficiency of backend of the rectifying circuit, because the charge pump itself does not have an inductance and have higher efficiency. For example, a charge pump having the conventions factor 3 has efficiency of about 95%. Furthermore, the charging efficiency is not affected by the difference between the input voltage and the output voltage, therefore, the structure may be applied to a wireless charging scenario with high-input voltage, thereby improving the charging speed, and realizing wirelessly fast charging, and improving user's experience. In addition, the charge pump principle is used to realize the high-voltage wireless charging. In addition, the high-voltage wireless charging is realized by adopting the charge pump principle.

The current of the receiving coil may be greatly reduced by a manner of increasing voltage of the front-end and decreasing current of the front-end. Since the heating of the receiving coil is proportional to square of the current of the receiving coil, the heating of the receiving coil may be greatly reduced and the heating of the coil is improved.

Specifically, a charging loop of the electronic device 100 may be formed by the receiving coil 112, the rectifying circuit 122, the step-down module 106, and the battery 101 sequentially coupled in series. The receiving coil 112 is configured to receive the alternating current power through the electromagnetic induction or the electromagnetic resonance. The rectifying circuit 122 is configured to convert the alternating current power received by the receiving coil 112 into the direct current power, and then input the direct current power into the step-down module 106 to perform step-down on the voltage. The direct current power stepped down through the step-down module 106 is employed to charge the battery 101.

Therefore, with using the characteristics of smaller the difference between the input voltage and the output voltage of the buck circuit, higher the efficiency, the battery 101 may be charged through the buck circuit during the pre-charging and the trickle charging, so as to still guarantee the charging efficiency, reduce the heating of the buck circuit itself. At this time, the charging control may be completed by controlling the step-down module 106, thereby improving and simplifying the control method.

Further, referring to FIGS. 3-6, the electronic device 100 also includes a detection module 107. The detection module 107 is configured to detect state parameters of the battery 101 and send the state parameters of the battery 101 to the first controller 105. The first controller 105 is configured to control the entirely wireless charging process according to the state parameters of the battery 101.

In some embodiments, the state parameters of the battery 101 may include electric quantity of the battery, a voltage of the battery and a charging current. The detection module 107 may include: a voltage detection circuit and a current detection circuit. The voltage detection circuit 304 may be configured to sample the voltage of the battery 101 and send a value of the sampled voltage to the first controller 105. The voltage detection circuit may sample the voltage of the battery 101 by a manner of being coupled in series and dividing a voltage. The current detection circuit may be configured to sample the current of the battery 101 and send a value of the sampled current to the first controller 105. The current detection circuit may sample and detect the current of the battery 101 through a current-sense resistor or a galvanometer.

Referring to embodiments of the FIGS. 3-6, the electronic device 100 further includes a load switch K1. The load switch K1 is coupled between the voltage and current adjusting module 103 and the battery 101. The load switch K1 is also coupled to the first controller 105, and the first controller 105 is configured to control the load switch K1 to turn off to stop charging in response to the electronic device 100 having a fault.

In some examples, one terminal of the load switch K1 may be coupled to the output terminal of the voltage and current adjusting module 103, and the other terminal of the load switch K1 may be correspondingly coupled to the battery 101 and the output terminal of the step-down module 106, and a control terminal of the load switch K1 is coupled to the first controller 105. The first controller 105 is configured to control the load switch K1 to switch off to turn off the charging circuit in responding to the electronic device 100 having the fault, for example, a system of the electronic device 100 runs off or is down, thereby protecting safety of the charging. For example, the load switch K1 may be a load switch with I2C (Inter-Integrated Circuit) and a watchdog function.

The structure of the voltage and current adjusting module 103 in the embodiment of the present disclosure is described below with reference to FIGS. 7-9. The voltage and current adjusting module 103 includes one charge pump unit 113 or multiple charge pump units 113 coupled in series or in parallel. As an example, when there is one charge pump unit 113, an input terminal of the one charge pump unit 113 is coupled to the rectifying circuit 122, and an output terminal of the one charge pump unit 113 is coupled to the battery 101. When the multiple charge pump units 113 are coupled in parallel, an input terminal of each charge pump unit 113 is coupled to the rectifying circuit 122, and an output terminal of each charge pump unit 113 is coupled to the battery 101. When the multiple charge pump units 113 are coupled in series, an input terminal of a first charge pump unit 113 is coupled to the rectifying circuit 122, and an input terminal of each of other charge pump units 113 except the first charge pump unit 113 is coupled to an output terminal of the former charge pump unit 113, and an output terminal of the last charge pump unit 113 is coupled to the battery 101. The multiple charge pump units 113 may adopt the same circuit structures.

Figure 7:
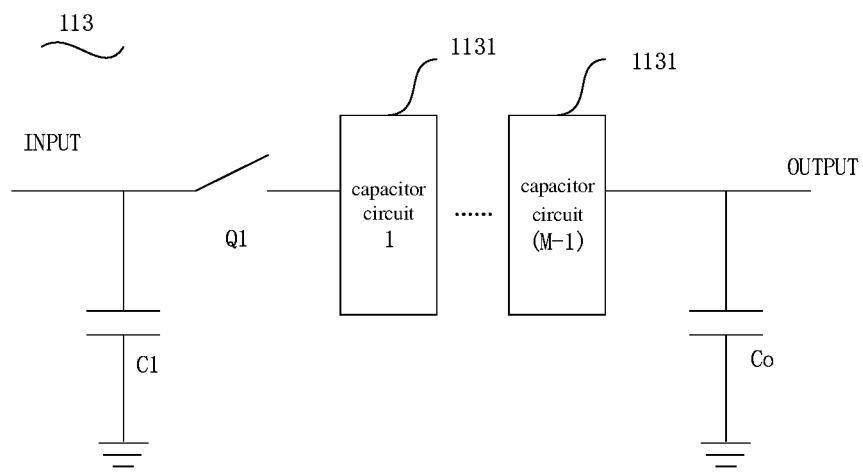
FIG. 7 is a block diagram illustrated a voltage and current adjusting module of an electronic device according to an embodiment of the present disclosure.

As illustrated in FIG. 7, each charge pump unit 113 includes a first switch Q1, an output capacitor Co, and a (M−1)-stage cascade connected capacitor circuits 1131, M is an integer greater than 1. A first terminal of the first switch Q1 is coupled to an input terminal INPUT of the charge pump unit 113, and a second terminal of the first switch Q1 is coupled to the (M−1)-stage cascade connected capacitor circuits 1131. A first terminal of the output capacitor Co is coupled to an output terminal OUTPUT of the charge pump unit 113 and the (M−1)-stage cascade connected capacitor circuits 1131, and a second terminal of the output capacitor Co is grounded.

Figure 8:
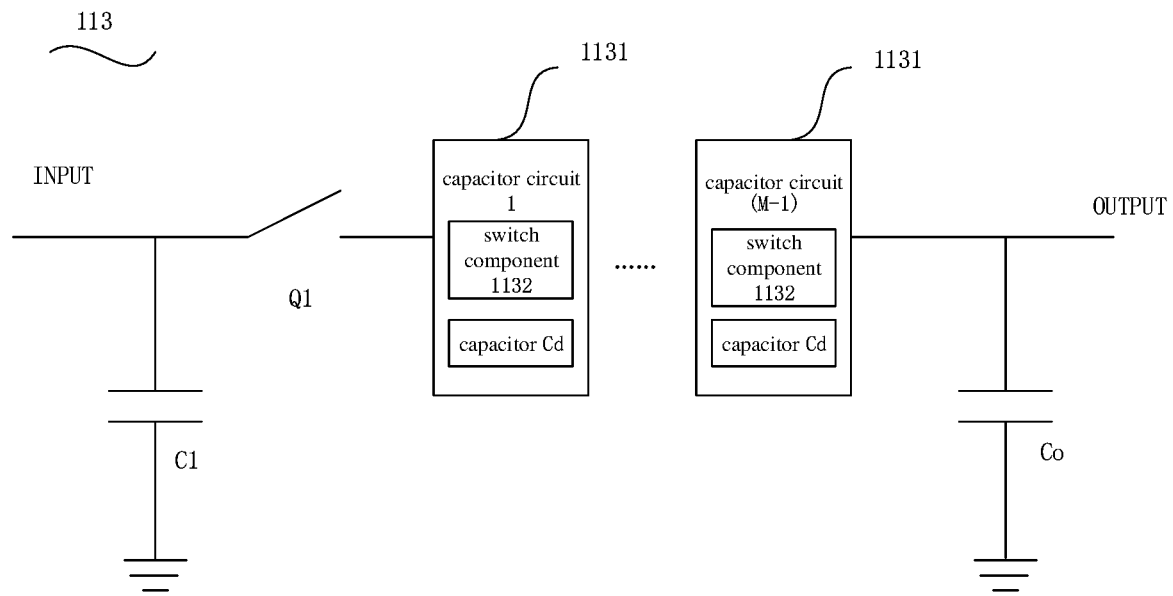
FIG. 8 is a block diagram illustrated a voltage and current adjusting module of an electronic device according to another embodiment of the present disclosure.

Referring to FIG. 8, each stage of capacitor circuit 1131 includes a capacitor Cd and a switch component 1132, and the switch component 1132 of each stage of capacitor circuit in the (M−1)-stage of capacitor circuits 1131 is controlled, such that capacitors Cd in the (M−1)-stage of capacitor circuits 1131 are coupled in parallel to each other and then coupled in parallel with the output capacitor Co, or the capacitors Cd in the (M−1)-stage of capacitor circuits 1131 are coupled in series and then coupled in series with the output capacitor Co.

The capacitors Cd and the output capacitor Co in the M-stage capacitor circuit are switched between coupled series and coupled parallel, such that, the output voltage is 1/M of the input voltage and the output current is M times of the input current.

It may be understood that M may be set according to the conversion times required by each charge pump unit 113. As an example, when the conversion factor of the charge pump unit 113 is 3, M may be 3, and a 2-stage of capacitor circuit 1131 is provided.

Specifically, the switch component 1132 may include a first parallel control switch, a second parallel control switch, and a series control switch. A first terminal of a second capacitor C2 is coupled to the former stage capacitor circuit 1131 (the present stage is not the first stage) or the input terminal INPUT of the charge pump unit 113 (the present stage is the first stage). A first terminal of the first parallel control switch is coupled to a second terminal of the second capacitor C2, and a second terminal of the first parallel control switch is grounded. A first terminal of the second parallel control switch is coupled to the first terminal of the second capacitor C2, and a first terminal of the series control switch is coupled to the second terminal of the second capacitor C2, and the second terminal of the series control switch is coupled to the second terminal of the second parallel control switch and then coupled to the latter stage capacitor circuit 1131 (the present stage is not the (M−1) stage) or the output terminal OUTPUT of the charge pump unit 113 (the present stage is the (M−1) stage).

It may be noted that the first parallel control switch, the second parallel control switch, and the series control switch in the switch component 1132 and the first switch Q1 each may be coupled to the corresponding driving circuit and be turned on or off under the driving of the corresponding driving circuit. In addition, the driving circuit may be controlled by an independent controller or controlled by the first controller 105. The driving circuit drives the corresponding switch to be turned on when receiving a turn-on control signal sent from the controller or the first controller 105, and drives the corresponding switch to turn off when receiving a turn-off control signal sent from the controller or the first controller 105.

It is understandable that when the voltage and current adjustment module 103 desires to be operated, the first controller 105 may directly control each charge pump unit 113 to enable the output voltage of the charge pump unit 113 to be 1/M of the input voltage of that, and the output current of the charge pump to be M times of the input current of that. Alternatively, the first controller 105 may output an enable signal to the controller, and the controller then controls each charge pump unit 113, to enable the output voltage of the charge pump unit 113 to be 1/M of the input voltage of that, and the output current of the charge pump unit 113 to be M times of the input current of that.

Specifically, operating modes of the charge pump unit 113 is as follows:

At a first stage, the charge pump units 113 operates in series mode, and the first switch Q1 and the series control switch of each stage of capacitor circuit in the (M−1)-stage of capacitor circuits 1131 are turned on, and the first parallel control switch and the second parallel control switch of each stage of capacitor circuit in the (M−1)-stage of capacitor circuits 1131 are turned off, and the capacitors Cd in the (M−1)-stage of capacitor circuits 1131 are coupled in series and then is coupled in series with the output capacitor Co.

At a second stage, the charge pump units 113 operates in parallel mode, and the first switch Q1 and the series control switch of each stage of capacitor circuit in the (M−1)-stage of capacitor circuits 1131 is turned off, and the first parallel control switch and the second parallel control switch of each stage of capacitor circuit in the (M−1)-stage of capacitor circuits 1131 are turned on, and the capacitors Cd in the (M−1)-stage of capacitor circuits 1131 are coupled in parallel and then is coupled in parallel with the output capacitor Co.

Therefore, the charge pump units 113 are switched between the first stage and the second stage, that is, switched between the series mode and the parallel mode, such that the output voltage is 1/M of the input voltage, and the output current is M times of the input current.

Figure 9:
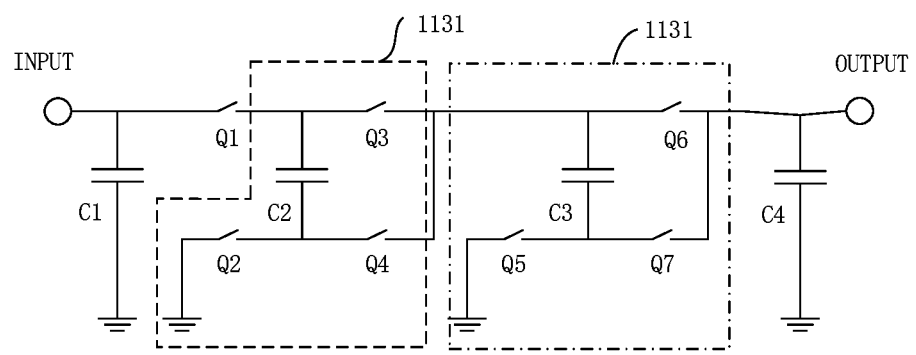
FIG. 9 is a block diagram illustrated a voltage and current adjusting module of an electronic device according to a specific embodiment of the present disclosure.

Further, referring to FIGS. 7-9, each charge pump unit 113 further includes a first capacitor C1. A first terminal of the first capacitor C1 is coupled to the input terminal INPUT of the charge pump unit, and the second terminal of the first capacitor C1 is grounded. C1 is an input capacitor of the charge pump unit 113, which is used to keep the circuit stable.

As an example, the first switch Q1, the first parallel control switch, the second parallel control switch, and the series control switch each may be a switch tube, such as a triode, a MOS tube, and the like. The first capacitor C1, the output capacitor Co, and the capacitor Cd each may be a ceramic capacitor, such as a low ESR (Equivalent Series Resistance) ceramic capacitor.

As an example, drive circuits of the first switch Q1, the first parallel control switch, the second parallel control switch, and the series control switch may be arranged on an integrated circuit. Turning on or turning off of the first switch Q1, the first parallel control switch, the second parallel control switch, and the series control switch may be controlled by the integrated circuit. The first switch Q1, the first parallel control switch, the second parallel control switch, and the series control switch may be arranged on another integrated circuit, and the first capacitor C1, the output capacitor Co, and the capacitor Cd may be externally connected to the corresponding positions of the another integrated circuit.

A structure and an operating principle of the charge pump unit 113 are further described below by taking M=3 as an example.

Referring to FIG. 9, each charge pump unit 113 may include first switch Q1 to seventh switch Q7, first capacitor C1 to third capacitor C3, and output capacitor Co. The second switch Q2, the third switch Q3, the fourth switch Q4 and the second capacitor C2 are formed as a first-stage capacitor circuit 1131. The second capacitor C2 is a capacitor Cd in the first-stage capacitor circuit 1131, and the second switch Q2, the third switch Q3, and the fourth switch Q4 are switch components, respectively corresponding to a first parallel control switch, a second parallel control switch, and a series control switch, in the first-stage capacitor circuit 1131. The fifth switch Q5, the sixth switch Q6, the seventh switch Q7 and the third capacitor C3 are formed as a second-stage capacitor circuit 1131. The third capacitor C3 is a capacitor Cd in a second-stage capacitor circuit 1131, and the fifth switch Q5, the sixth switch Q6 and the seventh switch Q7 are switch components, respectively corresponding to a first parallel control switch, a second parallel control switch, and a series control switch, in the second-stage capacitor circuit 1131.

Specifically, one terminal of the first switch Q1 is coupled to the input terminal INPUT of the charge pump unit 113. A first terminal of the second capacitor C2 is coupled to a second terminal of the first switch Q1. A first terminal of the second switch Q2 is coupled to a second terminal of the second capacitor C2, and a second terminal of the second switch Q2 is grounded. A first terminal of the third switch Q3 is coupled to a first terminal of the second capacitor C2. A first terminal of the fourth switch Q4 is coupled to a second terminal of the third switch, and a second terminal of the fourth switch Q4 is coupled to a second terminal of the second capacitor C2. A first terminal of the third capacitor C3 is correspondingly coupled to a second terminal of the third switch Q3 and a first terminal of the fourth switch Q4. A first terminal of the fifth switch Q5 is coupled to a second terminal of the third capacitor C3, and a second terminal of the fifth switch Q5 is grounded. A first terminal of the sixth switch Q6 is coupled to a first terminal of the third capacitor C3. A first terminal of the seventh switch Q7 is coupled to a second terminal of the sixth switch Q6 and then coupled to the output terminal OUTPUT of the charge pump unit 113, and a second terminal of the seventh switch Q7 is coupled to a second terminal of the third capacitor C3. A first terminal of the fourth capacitor C4 is coupled to the output terminal OUTPUT of the charge pump unit 113, a second terminal of the fourth capacitor C4 is grounded.

In addition, a control terminal of each of the first switch Q1 to the seventh switch Q7 may be coupled to the corresponding drive circuit, and each of the first switch Q1 to the seventh switch Q7 may be turned on or off under the driving of the corresponding drive circuit. The drive circuit may be controlled by an independent controller or controlled by the first controller 105. The drive circuit drives the corresponding switch to be turned on when receiving the turn-on control signal sent by the controller or the first controller 105, and drives the corresponding switch to be turned off when receiving the turn-off control signal sent by the controller or the first controller 105

Specifically, operating modes of the charge pump unit 113 are as follows:

At a first stage, the first switch Q1, the fourth switch Q4 and the seventh switch Q7 are turned on, and the second switch Q2, the third switch Q3, the fifth switch Q5 and the sixth switch Q6 are turned off. Thus, the second capacitor C2, the third capacitor C3 and the fourth capacitor C4 are formed as a series relationship.

At a second stage, the first switch Q1, the fourth switch Q4 and the seventh switch Q7 are turned off, and the second switch Q2, the third switch Q3, the fifth switch Q5 and the sixth switch Q6 are turned on. Thus, the second capacitor C2, the third capacitor C3 and the fourth capacitor C4 are formed as a parallel relationship.

The charge pump unit 113 may be switched between the first stage and the second stage, that is, the second capacitor C2, the third capacitor C3 and the fourth capacitor C4 may be switched between the series relationship and the parallel relationship, so that the output voltage is ⅓ of the input voltage, and the output current is 3 times of the input current.

Therefore, with employing the charge pump, the charging efficiency may be improved, and the charging speed may be improved, and the wirelessly fast charging may be realized.

Corresponding to the electronic device 100 of the embodiments according to FIGS. 1-9, the present disclosure also provides a wireless charging apparatus 200.

Figure 10:
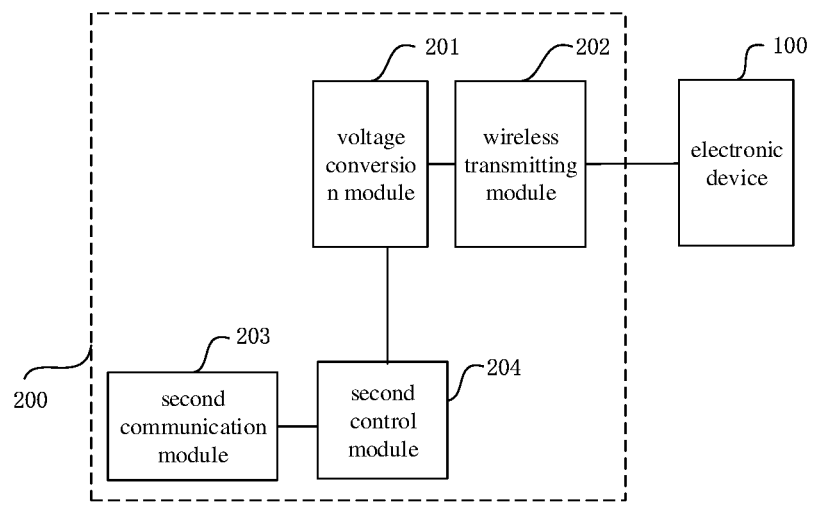
FIG. 10 is a block diagram illustrated a wireless charging apparatus according to embodiments of the present disclosure.
Figure 11:
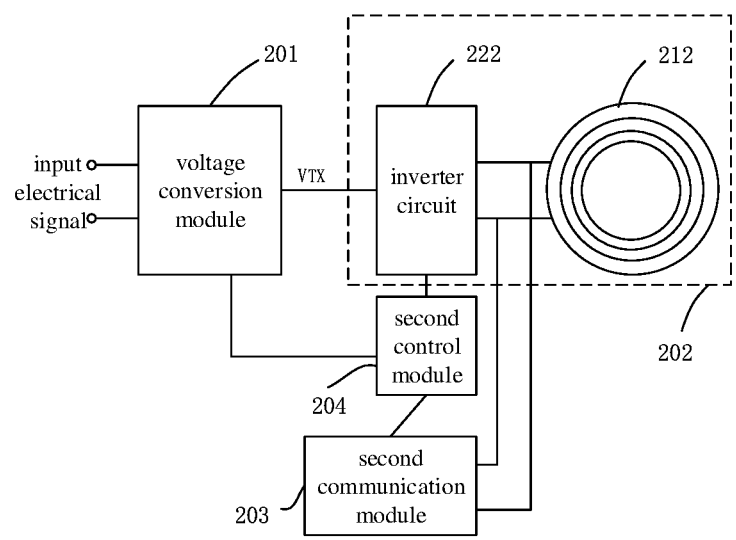
FIG. 11 is a block diagram illustrated structure of a wireless charging apparatus according to an embodiment of the present disclosure, in which communication is performed through a transmitting coil.
Figure 12:
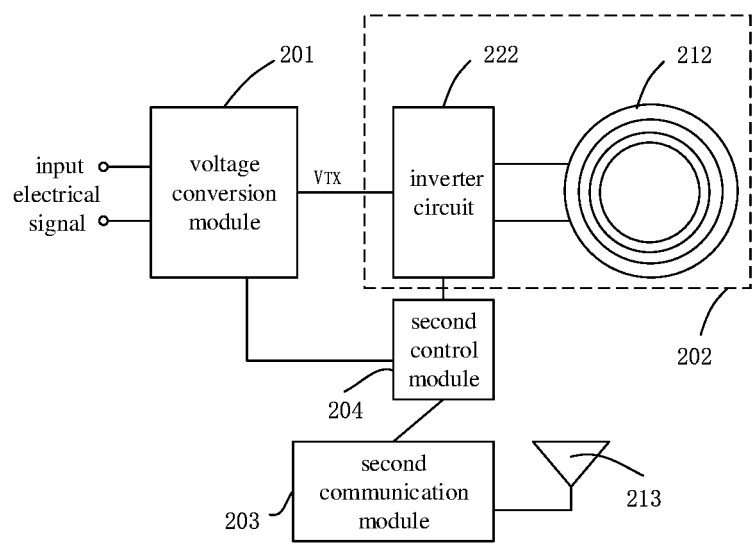
FIG. 12 is a block diagram illustrated structure of a wireless charging apparatus according to an embodiment of the present disclosure, in which communication is performed through an antenna.

Referring to FIGS. 10-12, the wireless charging apparatus 200 includes a voltage conversion module 201, a wireless transmitting module 202, a second communication module 203, and a second controller 204.

The voltage conversion module 201 is configured to perform conversion on an input electrical signal to output an adjustable direct current power. The input electrical signal may be an alternating current power or a direct current power. In other words, the wireless charging apparatus 200 is configured to convert the input direct current power or the input alternating current power into an electromagnetic signal to perform power transmission in a wireless manner.

Voltage of the adjustable direct current power is adjustable. The voltage VTX of the adjustable direct current power may be adjusted in real time by adjusting an operating duty cycle of the voltage conversion module 201. As an example, the voltage conversion module 201 may be a flyback switching power supply conversion module, which is configured to convert the input electrical signal, such as alternating current of municipal electric power (220V AC), into the adjustable direct current power, and provide to the wireless transmitting module 202.

It may be noted that the input electrical signal may be provided by a power supply apparatus. When the power supply device provides a direct current power to the wireless charging apparatus 200, the power supply device may include: a rectifying circuit, a transformer circuit, a control circuit, and a charging interface, etc. The power supply device may convert an input alternating current power into the direct current power for outputting and providing to the wireless charging apparatus 200. The voltage conversion module 201 may convert the input direct current power into the adjustable direct current power. For example, the power supply device may be an adapter, a mobile power pack, or a vehicle power supply and the like.

Alternatively, when the power supply device directly provides an alternating current power to the wireless charging apparatus 200, the voltage conversion module 201 may convert the input alternating current power into the adjustable direct current power. The power supply device may be an AC power.

The wireless transmitting module 202 is coupled to the voltage conversion module 201, and configured to convert the adjustable direct current power provided by the voltage conversion module 201 into an electromagnetic signal and transmit the electromagnetic signal through the wireless manner. In some embodiments, the wireless transmitting module 202 may convert the adjustable direct current power provided by the voltage conversion module 201 into the alternating current power that may be coupled to a transmitting coil 212, such that the transmitting coil 212 converts the alternating current power into the electromagnetic signal for transmitting.

In some embodiments, the wireless transmitting module 202 includes an inverter circuit 222. The inverter circuit 222 is configured to convert the direct current power provided by the voltage conversion module 201 into the alternating current power, and couple the alternating current power to the transmitting coil 212 to realize electric power transmission. Specifically, the inverter circuit may include multiple switching tubes, and the inverter circuit 222 is controlled to perform conversion by controlling on and off of the multiple switching tubes.

In some embodiments, the wireless charging apparatus 200 may be a wireless charging base or a device having a power storage function, or the like. When the wireless charging apparatus 200 is the device having the power storage function, the wireless charging apparatus 200 further includes a power storage module (for example, a lithium battery), which may obtain and store electric power from an external power supply device. Therefore, the power storage module may provide the electric power to the wireless transmitting module 202. It may be understood that the wireless charging apparatus 200 may obtain electric power from the external power supply device in a wired or wireless manner. For the wired manner, for example, the charging interface (for example, a Type-C interface) is connected to the external power supply device to obtain the electric power. For the wireless manner, for example, the wireless charging apparatus 200 includes a wireless receiving circuit, the wireless receiving circuit may obtain electric power from the device having the wireless charging function in the wireless manner.

The second communication module 203 is communicated with an electronic device 100. A communication mode of the second communication module 203 matches a communication mode of the first communication module 104. For example, when the first communication module 104 employs Bluetooth, Wi-Fi or other modes, the second communication module 203 employs the corresponding communication mode. As illustrated in FIG. 11, the second communication module 203 may wirelessly communicate with the electronic device 100 through a separate antenna 213 or through sharing the antenna 213 of the wireless charging apparatus 200. The antenna 213 may be a Bluetooth antenna, a Wi-Fi antenna, or an antenna applicable for other communication manners. For another example, the second communication module 203 may also implement the communication by a signal coupled manner when the first communication module 104 implements the communication by the signal coupled manner. As illustrated in FIG. 12, the second communication module 203 may share the transmitting coil 121 to modulate a communication signal onto the transmitting coil 121 for communication.

The second controller 204 is coupled to the second communication module 203 and the voltage conversion module 201 correspondingly. The second controller 204 is configured to communicate with the electronic device 100 through the second communication module 203, and receive information such as control information sent by the electronic device, and control the duty cycle of the voltage conversion module according to the received information, thereby adjusting the voltage of the adjustable direct current power in the real-time, ensuring that output of the wireless charging apparatus 200 matches a requirement of the electronic device 100.

Therefore, in the embodiment of the present disclosure, the voltage of the adjustable direct current power is adjusted in real time to ensure that the output of the wireless charging apparatus 200 matches the requirements of the electronic device 100, to realize accurate and simple control.

The present disclosure also provides a wireless charging method below based on the wireless charging apparatus and the electronic device according to the foregoing embodiments.

In embodiments of the present disclosure, the electronic device may be wirelessly charged by the wireless charging apparatus, and an adjustable direct current power may convert into an electromagnetic signal by the wireless charging apparatus, for transmission. The electromagnetic signal transmitted by the wireless charging apparatus is received by the electronic device through the wireless receiving module, and the electromagnetic signal may be converted to the direct current power.

During the charging process, the electronic device may collect state parameters (current, voltage, etc.) of the battery, and the battery is charged through the voltage and current adjustment module in response to the present voltage of the battery being greater than the preset fast charging voltage. The specific charging process may be realized through adjusting direct current power input into the wireless transmitting module of the wireless charging apparatus, thereby realizing wirelessly fast charging.

Figure 13:
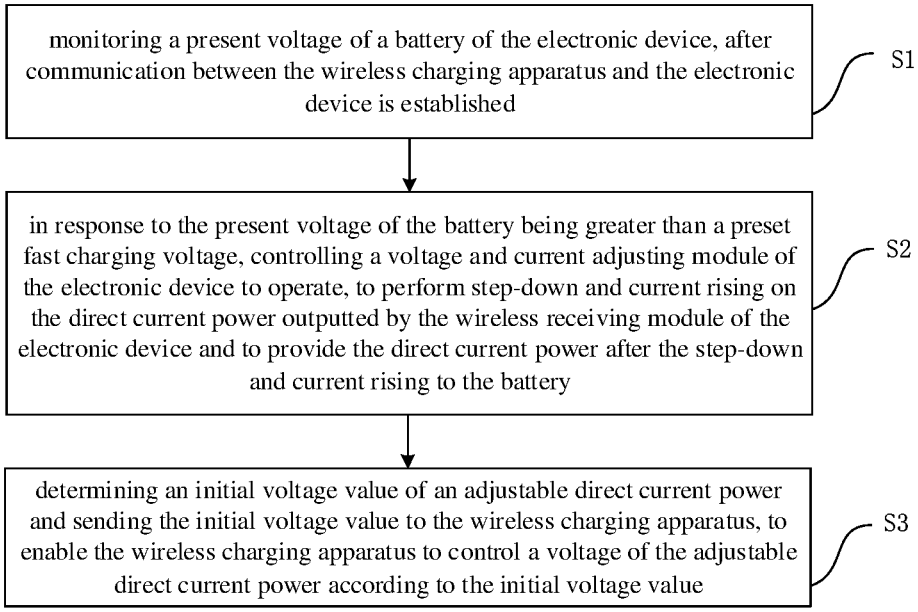
FIG. 13 is a flowchart illustrated a wireless charging method according to embodiments of the present disclosure.

Referring to FIG. 13, the wireless charging method according to embodiment of the present disclosure includes the following.

S1: a present voltage of a battery of the electronic device is monitored after communication between the wireless charging apparatus and the electronic device is established.

As an example, when the electronic device is placed in a wireless charging range of the wireless charging apparatus, establishing the communication between the wireless charging apparatus and the electronic device is performed. The fast charging function may be used in response to the communication being established successfully. At this time, the present voltage of the battery is monitored, and the fast charge mode may be executed according to the present voltage of the battery. The fast charge function cannot be used when establishing the communication fails. At this time, the battery of the electronic device is charged through the step-down module.

Specifically, in response to the communication between the wireless charging apparatus and the electronic device being not established, the step-down module of the electronic device is controlled to operate to perform step-down on the direct current power outputted by the wireless receiving module and provide the stepped down direct current power to the battery. That is, when establishing the communication between the wireless charging device and the electronic device fails, the voltage and current adjusting module turns off, the step-down module operates, and the direct current power outputted by the wireless receiving module is stepped down by the step-down module and then supplied to the battery.

In an embodiment of the present disclosure, when the step-down module is operating, the voltage of the adjustable direct current power is adjusted by the wireless charging apparatus according to the preset conventional voltage value. At this time, the wireless charging apparatus does not perform the step-down. For example, the preset conventional voltage value may be 5V.

That is, in response to the communication between the wireless charging apparatus and the electronic device being not established, the voltage conversion module may be directly controlled by the second controller of the wireless charging apparatus to adjust the voltage of the adjustable direct current power to the preset conventional voltage value. An inverse conversion is performed on the adjustable direct current power by the inverter circuit to generate the alternating current power. The alternating current power is supplied to the transmitting coil and converted into the electromagnetic signal to realize electric power transmission. The electromagnetic signal transmitted by the transmitting coil is received by the receiving coil of the electronic device and converted into the alternating current power. The rectifying circuit may rectify the alternating current power into the direct current power. Because of conversion loss resulted by the inverter circuit, the transmitting coil, the receiving coil and the rectifying circuit, a voltage of a direct current power output by the rectifying circuit is slightly lower than the preset conventional voltage value. The direct current power is supplied to the battery stepped down by the step-down module. In addition, the first controller of the electronic device may control the step-down module, such that the direct current power outputted by the step-down module may satisfy a charging requirement of the battery and may be directly supplied to the battery.

Specifically, the first controller may determine whether a peak value or an average value of the output voltage and/or output current of the step-down module matches a preset charging voltage value and/or a preset charging current value of the battery. A step-down ratio of the step-down module may be adjusted when not match The step-down ratio may refer to a ratio of the output voltage of the step-down module to the input voltage of that.

It may be understood that in an embodiment of the present disclosure, "matching the preset charging voltage value and/or the preset charging current value of the battery" includes: the voltage value and/or current value of the direct current power output by the step-down module is equal to or floated within a preset rang of a preset charging voltage and/or a preset charging current of the battery.

S2: in response to the present voltage of the battery being greater than a preset fast charging voltage, a voltage and current adjusting module of the electronic device is controlled to operate, to perform step-down and current rising on the direct current power outputted by the wireless receiving module of the electronic device and to provide the direct current power after the step-down and current rising to the battery.

The preset fast charging voltage may be any value greater than or equal to 3V and less than or equal to 3.6V. For example, the preset fast charge voltage may be 3.5V.

S3: an initial voltage value of an adjustable direct current power is determined and the initial voltage value is sent to the wireless charging apparatus, to enable the wireless charging apparatus to control a voltage of the adjustable direct current power according to the initial voltage value.

In an embodiment of the present disclosure, in response to the present voltage of the battery being less than or equal to the preset fast charging voltage, a step-down module of the electronic device is controlled to operate, to perform step-down on the direct current power outputted by the wireless receiving module, and provide the stepped down direct current power to the battery.

In other words, in response to the communication between the wireless charging apparatus and the electronic device being successfully established, the present voltage of the battery of the electronic device may be monitored. In response to the present voltage of the battery being less than or equal to the preset fast charging voltage, pre-charging is performed, that is, the pre-charging is performed on the battery of the electronic device through the step-down module. In response to the present voltage of the battery being greater than the preset fast charging voltage, the wireless fast charging mode is executed to perform a step-up adjustment on the electronic device to achieve fast charging and charge the battery of the electronic device through the voltage and current adjusting module.

In response to the present voltage of the battery being less than or equal to the preset fast charging voltage, the voltage and current adjusting module turns off, the step-down module operates, and the direct current power outputted by the wireless receiving module is stepped down by the step-down module and then supplied to the battery. Moreover, in an embodiment of the present disclosure, when the step-down module is operating, the voltage of the adjustable direct current power is adjusted by the wireless charging apparatus according to the preset conventional voltage. At this time, the wireless charging apparatus does not perform the step-up, for example, the preset conventional voltage value may be 5V. The charging process of this embodiment is basically the same as the charging process of "the communication between the wireless charging apparatus and the electronic device being not established", and is not described in detail.

In response to the present voltage of the battery being greater than the preset fast charging voltage, the wireless fast charging mode is executed, the initial voltage value of the adjustable direct current power of the wireless charging apparatus is determined, and the voltage of the adjustable direct current power is increased on the basis of the initial voltage value. At the same time, the step-down module turns off, and the voltage and current adjusting module operates, and the battery is charged through the voltage and current adjusting module.

In an embodiment of the present disclosure, the determining the initial voltage value of the adjustable direct current power includes: determining the initial voltage value according to the present voltage of the battery. The initial voltage value is N times of the present voltage of the battery plus a loss compensation value, and N is a conversion factor of the voltage and current adjusting module. For example, for a voltage and current adjusting module having a conversion factor 3, the initial voltage value is 3 times of the present voltage of the battery plus the loss compensation value.

As an example, the loss compensation value may include the conversion loss resulted by the inverter circuit, the transmitting coil, the receiving coil and the rectifying circuit. The specific loss compensation value may be obtained by testing the actual wireless charging apparatus and the actual electronic device.

In an embodiment of the present disclosure, the first controller of the electronic device may determine whether the present voltage of the battery is greater than the preset fast charging voltage, and in response to the present voltage of the battery being greater than the preset fast charging voltage, the initial voltage value of the adjustable direct current power is determined, and the initial voltage value of the adjustable direct current power is sent to the wireless charging apparatus, and the step-down module is controlled to turn off and the voltage and current adjusting module is controlled to operate. The wireless charging apparatus may receive the initial voltage value of the adjustable direct current power sent by the electronic device, and control the voltage conversion module according to the initial voltage value of the adjustable direct current power to adjust the voltage of the adjustable direct power to the initial voltage value. The adjustable direct current power is inverted by the inverter circuit to generate the alternating current power, and the alternating current power is supplied to the transmitting coil and is converted into the electromagnetic signal to realize the electric power transmission. The electromagnetic signal transmitted by the transmitting coil is received by the receiving coil of the electronic device and converted into the alternating current power. The rectifying circuit may rectify the alternating current power into the direct current power. Because of conversion loss of the inverter circuit, the transmitting coil, the receiving coil and the rectifying circuit, a voltage of the direct current power output by the rectifying circuit is basically maintained at N times of the present voltage of the battery, and the direct current power stepped down by the voltage and current adjusting module is supplied to the battery.

In addition, the first controller of the electronic device may continue to adjust the adjustable direct current power. The voltage of the adjustable direct current power is gradually increased on the basis of the initial voltage value, such that the direct current power outputted by the voltage and current adjusting module satisfies the charging requirement of the battery and is directly supplied to the battery.

Specifically, after adjusting by the wireless charging apparatus, the voltage of the adjustable direct current power to the initial voltage value, the method further includes: obtaining a present current of the battery; generating a step-up adjustment instruction according to the present current of the battery, to enable the wireless charging apparatus to perform step-up adjustment on the adjustable direct current power according to the step-up adjustment instruction.

In other words, after entering the wireless fast charging mode, at a constant current CC stage, the preset charging current ICC is determined, and the present current IBAT of the battery is monitored, and the present current IBAT of the battery is compared with the preset charging current ICC to generate the step-up adjustment instruction according to a comparison result. The electronic device may send the step-up adjustment instruction to the wireless charging apparatus, and the wireless charging apparatus may perform the step-up on the adjustable direct current power according to the step-up adjustment instruction. The inverter circuit performs the inversing conversion on the increased direct current power to generate the adjusted alternating current power, and the electromagnetic signal transmitted from the transmitting coil is finally adjusted. The receiving coil of the electronic device receives the electromagnetic signal transmitted by the transmitting coil and converts electromagnetic signal into the alternating current power. The rectifying circuit rectifies the alternating current power into the direct current power, and the direct current power is supplied to the battery stepped down by the voltage and current adjusting module. It may be understood that the direct current power outputted by the rectifying circuit is also stepped up with the stepping up of the adjustable direct current power, and a step-up amplitude of the direct current power is basically the same as a step-up amplitude of the adjustable direct current power.

In an embodiment of the disclosure, the generating the step-up adjustment instruction according to the present current of the battery includes: in response to a difference between a preset charging current and the present current of the battery being greater than or equal to a first preset threshold, increasing the voltage of the adjustable direct current power based on a first stepping voltage until the difference between the preset charging current and the present current of the battery is less than the first preset threshold.

Furthermore, the voltage of the adjustable direct current power is increased based on a second stepping voltage in response to the difference between the preset charging current and the present current of the battery being less than the first preset threshold and the difference between the preset charging current and the present current of the battery being greater than or equal to a second preset threshold, and the voltage of the adjustable direct current power is maintained constant in response to the difference between the preset charging current and the present current of the battery being less than the second preset threshold.

As an example, the first preset threshold $\Delta I1$ and the second preset threshold $\Delta I2$ are offsets of the preset charging current ICC. The first preset threshold is greater than the second preset threshold. The first stepping voltage is greater than the second stepping voltage.

Specifically, after entering the constant current CC stage, the preset charging current ICC is determined, the present current IBAT of the battery is monitored, and a relationship between the preset charging current ICC and the present current IBAT of the battery is determined.

In response to a difference between the preset charging current ICC and the present current IBAT of the battery being greater than or equal to the first preset threshold $\Delta I1$, that is, the current IBAT being less than or equal to ICC-$\Delta I1$, the current of the battery is considered to not reach a required current value, and the voltage of the adjustable direct current power of the wireless charging apparatus is increased according to the first stepping voltage value $\Delta V1$, so as to realize a coarse adjustment of the adjustable direct current power. For example, the electronic device may send the step-up adjustment instruction (including a step-up command and voltage adjustment information) to the wireless charging apparatus, and the wireless charging apparatus may increase the voltage of the adjustable direct current power based on the first stepping voltage value $\Delta V1$ according to the step-up adjustment instruction, The wireless transmitting module transmits the electromagnetic signal according to the adjustable direct current power which has increased the first stepping voltage value $\Delta V1$. The voltage and/or current adjustment of the battery is finally realized.

After increasing the voltage of the adjustable direct current power according to the first stepping voltage value $\Delta V1$, whether the difference between the preset charging current ICC and the present current IBAT of the battery is greater than or equal to the first preset threshold $\Delta I1$ is continued to be determined. If yes, the voltage of the adjustable direct current power is increased according to the first step voltage value $\Delta V1$ until the difference between the preset charging current ICC and the present current IBAT of the battery is less than the first preset threshold $\Delta I1$. In response to the difference between the preset charging current ICC and the present current IBAT of the battery being less than the first preset threshold $\Delta I1$, that is, the current IBAT being greater than ICC-$\Delta I1$, the voltage of the adjustable direct current power is maintained unchanged and the charging is continued.

Next, whether the difference between the preset charging current ICC and the present current IBAT of the battery is greater than or equal to the second preset threshold $\Delta I2$ is determined. The current of the battery may reduce along with the increasing of the voltage of the battery. In response to the difference between the preset charging current ICC and the present current IBAT of the battery being greater than or equal to the second preset threshold $\Delta I2$, that is, the current IBAT being less than or equal to ICC-$\Delta I2$, the voltage of the adjustable direct current power of the wireless charging apparatus is increased according to the second stepping voltage value $\Delta V2$, so as to realize a fine adjustment of the adjustable direct current power. For example, the electronic device may send the step-up adjustment instruction (including a step-up command and voltage adjustment information) to the wireless charging apparatus, and the wireless charging apparatus may increase the voltage of the adjustable direct current power based on the second stepping voltage value $\Delta V2$ according to the step-up adjustment instruction. The wireless transmitting module transmits the electromagnetic signal according to the adjustable direct current power which has increased the second stepping voltage value $\Delta V2$. The voltage and/or current adjustment of the battery is finally realized.

While increasing the voltage of the adjustable direct current power based on the second step voltage value $\Delta V2$, the present voltage VBAT of the battery is also monitored, and whether to enter a constant voltage CV stage is determined according to the present voltage VBAT of the battery. When not entering the constant voltage CV stage, whether the difference between the preset charging current ICC and the present current IBAT of the battery is greater than or equal to the second preset threshold $\Delta I2$ is continued to be determined. In response to the difference between the preset charging current ICC and the present current IBAT of the battery being greater than or equal to the second preset threshold $\Delta I2$, the voltage of the adjustable direct current power is continued to be increased based on the second step voltage $\Delta V2$. In response to the difference between the preset charging current ICC and the present current IBAT of the battery being less than the second preset threshold $\Delta I2$, the voltage of the adjustable direct current power may maintain unchanged and the charging is continued. In response to entering the constant voltage CV stage, the step down adjustment is performed on the voltage of the adjustable direct current power of the wireless charging apparatus.

In an embodiment of the disclosure, after increasing the voltage of the adjustable direct current power based on the second stepping voltage, the method further includes: monitoring a present voltage of the battery; in response to the present voltage of the battery being within a preset range of a preset charging voltage, generating a step-down adjustment instruction based on a third stepping voltage, to enable the wireless charging apparatus to adjust the voltage of the adjustable direct current power according to the step-down adjustment instruction.

It may be understood that in response to the present voltage of the battery being within the preset range of the preset charging voltage, the constant voltage CV stage is entered. The present voltage of the battery being within the preset range of the preset charging voltage may refer to that the present voltage of the battery is greater than a difference between the preset charging voltage VCV and a voltage deviation ΔVBAT and is less than a sum of the preset charging voltage VCV and the voltage deviation ΔVBAT. In response to the present voltage of the battery being not within the preset range of the preset charging voltage, the constant voltage CV stage is not entered.

Specifically, after entering the constant voltage CV stage, the voltage of the adjustable direct current power may be decreased based on the third stepping voltage ΔV3. For example, the electronic device may send the step-up adjustment instruction (including a step-up command and voltage adjustment information) to the wireless charging apparatus, and the wireless charging apparatus may increase the voltage of the adjustable direct current power based on the third stepping voltage value ΔV3 according to the step-up adjustment instruction. The wireless transmitting module transmits the electromagnetic signal according to the adjustable direct current power which has increased the third stepping voltage value ΔV3. The voltage and/or current adjustment of the battery is finally realized.

Further, after adjusting the voltage of the adjustable direct current power according to the step-down adjustment instruction, the method further includes: monitoring a present current of the battery; in response to the present current of the battery being less than or equal to a cutoff current, controlling the voltage and current adjusting module to stop operating and controlling a step-down module of the electronic device to operate, to perform step-down on the direct current power outputted by the wireless receiving module, and provide the stepped-down direct current power to the battery.

The step-down adjustment instruction is generated based on a third stepping voltage, according to the present voltage of the battery, in response to the present current of the battery being greater than the cutoff current.

Specifically, after entering the constant voltage CV stage, the voltage of the adjustable direct current power is decreased based on the third stepping voltage ΔV3, and the present current of the battery is monitored. In response to the present current of the battery being greater than the cutoff current, whether the present voltage of the battery is within the preset range of the preset charging voltage is continued to be determined. In response to the present voltage of the battery being within the preset range of the preset charging voltage, the voltage of the adjustable direct current power is continued to be decreased based on the third stepping voltage ΔV3. In response to the present voltage of the battery being not in the preset range of the preset charging voltage, the voltage of the adjustable direct current power is maintained unchanged and the charging is continued.

In response to the present battery current being less than or equal to the cutoff current, the fast charge mode is exited and a conventional mode is entered, that is, the voltage and current adjusting module is controlled to turn off and the step-down module is controlled to operate. The direct current power outputted by the wireless receiving module after stepped down by the step-down module is supplied to the battery.

In an embodiment of the disclosure, the wireless charging apparatus is configured to the voltage of the direct current power is adjusted by the wireless charging apparatus according to a preset conventional voltage value, when the step-down module is operating. The wireless charging apparatus does not perform the step-up at this time. For example, the preset conventional voltage value may be 5V, and the voltage of the adjustable direct current power is adjusted to 5V by the wireless charging apparatus. At this time, the step-down module is controlled to adjust the voltage and/or current of the battery.

It may be noted that, in this embodiment, when the step-down module is operating, the wireless charging device may also maintain the voltage of the adjustable direct current power unchanged, without adjusting the voltage of the adjustable direct current power to the preset conventional voltage value.

Figure 14:
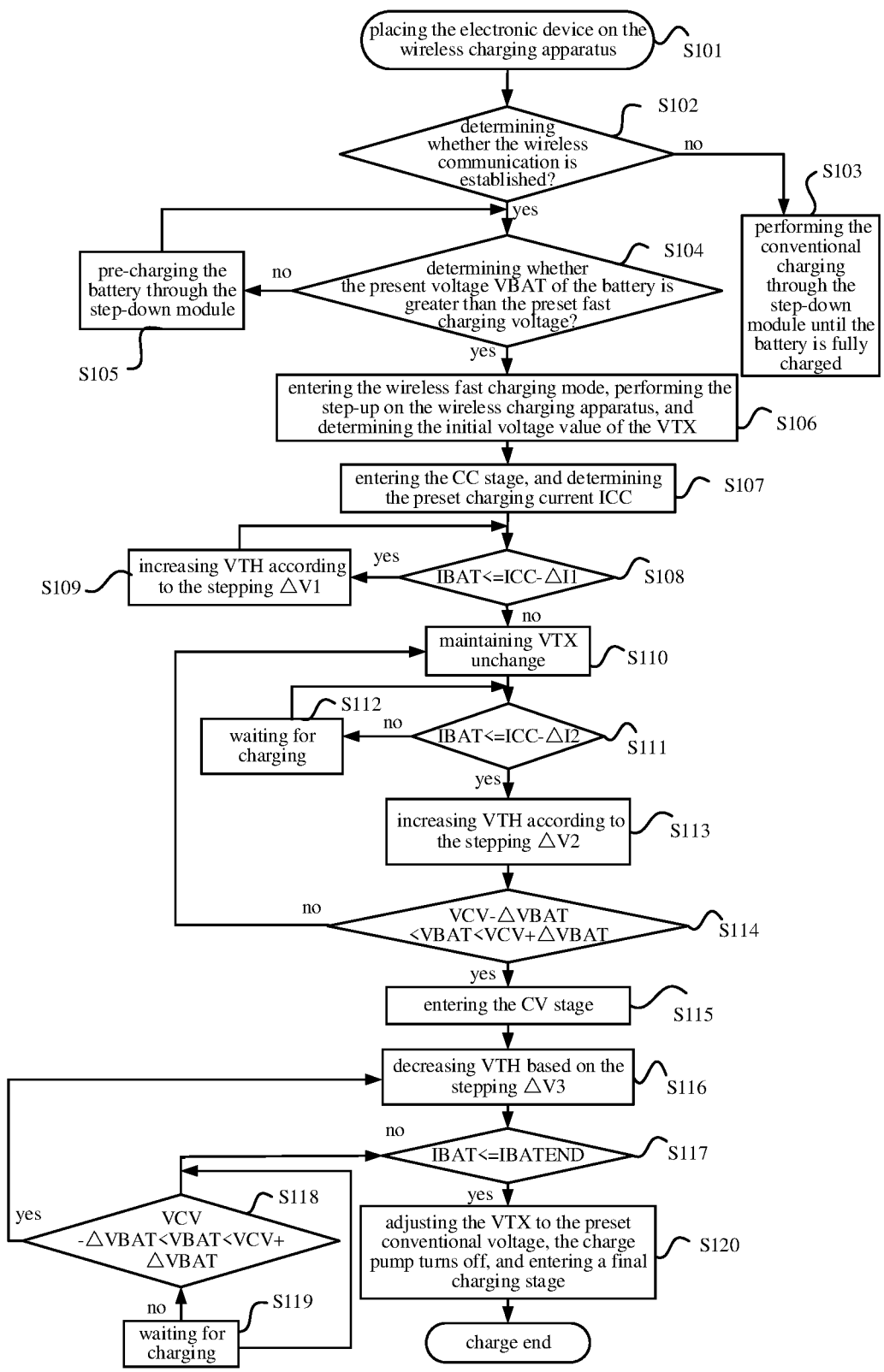
FIG. 14 is a flowchart illustrated a wireless charging method according to a specific embodiment of the present disclosure.

In a specific embodiment of the present disclosure, referring to FIG. 14, the wireless charging method includes the following.

S101: the electronic device is placed on the wireless charging apparatus.

S102: whether the communication of the electronic device and the wireless charging apparatus is successfully established is determined.

If yes, go to step S104; if not, go to step S103.

S103: the conventional charging is performed through the step-down module until the battery is fully charged (the wireless charging apparatus does not perform increasing the voltage).

S104: whether the present voltage of the battery is greater than the preset fast charging voltage is determined If yes, go to step S106; if not, go to step S105.

S105: the battery is pre-charged through the step-down module, and return to step S104.

S106: the wireless fast charging mode is entered, the step-up is performed on the wireless charging apparatus, and the initial voltage value of the adjustable direct current power of the wireless charging apparatus is determined.

S107: the constant current CC stage is entered, and the preset charging current ICC is determined.

S108: whether the difference between the preset charging current ICC and the present current IBAT of the battery is greater than or equal to the first preset threshold ΔI1, that is, whether the current IBAT is less than or equal to ICC-ΔI1, is determine.

If yes, go to step S109; if not, go to step S110.

S109: the voltage VTX of the adjustable direct current power of the wireless charging apparatus is increased according to the first stepping voltage ΔV1.

S110: the voltage VTX of the adjustable direct current power is maintained unchanged.

S111: whether the difference between the preset charging current ICC and the present current IBAT of the battery is greater than or equal to the second preset threshold ΔI2, that is, whether the current IBAT is less than or equal to ICC-ΔI2, is determined.

If yes, go to step S113; if not, go to step S112.

S112: wait for charging, that is, the voltage VTX of the adjustable direct current power is maintained unchanged, the charging is continued, and return to step S111.

S113: the voltage VTX of the adjustable direct current power of the wireless charging apparatus is increased according to the second stepping voltage ΔV2.

S114: whether the present voltage of the battery is within the preset range of the preset charging voltage, that is, whether the present voltage of the battery is greater than the difference between the preset charging voltage VCV and the voltage deviation ΔVBAT and less than the sum of the preset charging voltage VCV and the voltage deviation VBAT, is determined.

If yes, go to step S115; if not, go to step S110.

S115: the constant voltage CV stage is entered.

S116: the voltage VTX of the adjustable direct current power is decreased based on the third stepping voltage ΔV3.

S117: whether the present current IBAT of the battery is less than or equal to the cutoff current IBATEND is determined.

If yes, go to step S120; if not, go to step S118.

S118: whether the present voltage of the battery is within the preset range of the preset charging voltage, that is, whether the present voltage of the battery is greater than the difference between the preset charging voltage VCV and the voltage deviation ΔVBAT and less than the sum of the preset charging voltage VCV and the voltage deviation VBAT, is determined.

If yes, go to step S116; if not, go to step S119.

S119: charging waits, that is, the voltage VTX of the adjustable direct current power is maintained unchanged, the charging is continued, and return to step S118.

S120: the voltage VTX of the adjustable direct current power is adjusted to the preset conventional voltage value, the voltage and current adjusting module, such as the charge pump module, turns off, and the step-down module operates, and a final charging stage, such as a trickle charging stage, is entered, until the charging is completed.

Therefore, the wireless charging method of the embodiment of the present disclosure may accurately control the wireless charging process, thereby ensuring that the wireless charging may be completed safely, quickly and efficiently, and realizing the wireless fast charging function.

In order to implement the foregoing embodiments, the present disclosure also provides an electronic device.

Referring to FIGS. 1-6, the electronic device 100 includes a battery 101, a wireless receiving module 102, a voltage and current adjusting module 103, a first communication module 104, and a first controller 105.

The wireless receiving module 102 is configured to receive an electromagnetic signal transmitted by a wireless charging apparatus 200, and to convert the electromagnetic signal to a direct current power. The wireless charging apparatus 200 converts an adjustable direct current power to an electromagnetic signal for transmitting. The voltage and current adjusting module 103 is coupled to the wireless receiving module 102 and the battery 101 respectively, and the voltage and current adjusting module 103 is configured to perform step-down and current rising on the direct current power and provide the direct current power after the step-down and current rising to the battery 101. The first communication module 104 configured to perform wireless communication with the wireless charging apparatus 200. The first controller 105 is coupled to the first communication module 104 and the voltage and current adjusting module 103 respectively, and the first controller 105 is configured to monitor a present voltage of a battery 101, after communication between the wireless charging apparatus 200 and the first communication module 104 is established, and control the voltage and current adjusting module 103 to operate, to perform step-down and current rising on the direct current power outputted by the wireless receiving module 102 in response to the present voltage of the battery 101 being greater than a preset fast charging voltage, and determine an initial voltage value of an adjustable direct current power and send the initial voltage value to the wireless charging apparatus 200 through the first communication module 104, to enable the wireless charging apparatus 200 to control a voltage of the adjustable direct current power according to the initial voltage value.

In an embodiment of the disclosure, the first controller 105 is configured to determine the initial voltage value according to the present voltage of the battery 101. The initial voltage value is N times of the present voltage of the battery 101 plus a loss compensation value, and N is a conversion factor of the voltage and current adjusting module.

In an embodiment of the disclosure, the first controller 105 is further configured to, after the voltage of the adjustable direct current power is adjusted to the to the initial voltage value by the wireless charging apparatus 200, obtain a present current of the battery 101, and generate a step-up adjustment instruction according to the present current of the battery 101, and send the step-up adjustment instruction to the wireless charging apparatus 200, to enable the wireless charging apparatus 200 perform step-up adjustment on the adjustable direct current power according to the step-up adjustment instruction.

In an embodiment of the disclosure, the first controller 105 is further configured to, in response to a difference between a preset charging current and the present current of the battery being greater than or equal to a first preset threshold, increase the voltage of the adjustable direct current power based on a first stepping voltage until the difference between the preset charging current and the present current of the battery is less than the first preset threshold.

In an embodiment of the disclosure, the first controller 105 is further configured to, increase the voltage of the adjustable direct current power based on a second stepping voltage in response to the difference between the preset charging current and the present current of the battery being less than the first preset threshold and the difference between the preset charging current and the present current of the battery being greater than or equal to a second preset threshold, and maintain the voltage of the adjustable direct current power constant in response to the difference between the preset charging current and the present current of the battery being less than the second preset threshold.

In an embodiment of the disclosure, the first controller 105 is further configured to, after increasing the voltage of the adjustable direct current power based on the second stepping voltage, monitor a present voltage of the battery, and in response to the present voltage of the battery being within a preset range of a preset charging voltage, generate a step-down adjustment instruction based on a third stepping voltage and send the step-down adjustment instruction to the wireless charging apparatus 200, to enable the wireless charging apparatus 200 to adjust the voltage of the adjustable direct current power according to the step-down adjustment instruction.

In an embodiment of the disclosure, the electronic device 100 further includes: a step-down module 106 coupled in parallel with the voltage and current adjusting module 103. The step-down module 106 is configured to perform step-down on the direct current power, and to provide the stepped down direct current power to the battery 101.

In an embodiment of the disclosure, the first controller 105 is further configured to, after adjusting the voltage of the adjustable direct current power according to the step-down adjustment instruction, monitor a present current of the battery 101, and in response to the present current of the battery 101 being less than or equal to a cutoff current, control the voltage and current adjusting module 103 to stop operating and control a step-down module 106 of the electronic device to operate to perform the step-down on the direct current power outputted by the wireless receiving module 102.

In an embodiment of the disclosure, the first controller 105 is further configured to, generate the step-down adjustment instruction based on a third stepping voltage, according to the present voltage of the battery in response to the present current of the battery being greater than the cutoff current.

In an embodiment of the disclosure, the first controller 105 is further configured to, in response to the communication between the wireless charging apparatus 200 and the electronic device 100 being not established or the present voltage of the battery 101 being less than or equal to the preset fast charging voltage, control the step-down module 106 to operate to perform step-down on the direct current power converted by the wireless receiving module 102.

In an embodiment of the disclosure, the wireless charging apparatus 200 is configured to adjust the voltage of the direct current power according to a preset conventional voltage value when the step-down module 106 is operating.

In an embodiment of the disclosure, the electronic device 100 further includes: a load switch K1 coupled between the voltage and current adjusting module 103 and the battery 101. The load switch K1 is coupled to the first controller 105. The first controller 105 is configured to control the load switch K1 to turn off to stop charging in response to the electronic device 100 having a fault.

In an embodiment of the disclosure, referring to FIGS. 7-9, the voltage and current adjusting module 103 includes at least one charge pump unit 113 coupled in parallel or in series. Each charge pump unit 113 includes a first switch Q1, an output capacitor Co, and a (M−1)-stage cascade connected capacitor circuits 1131, M is an integer greater than 1, a first terminal of the first switch Q1 is coupled to an input terminal INPUT of the charge pump unit 113, and a second terminal of the first switch Q1 is coupled to the (M−1)-stage cascade connected capacitor circuits 1131, a first terminal of the output capacitor Co is coupled to an output terminal OUTPUT of the charge pump unit 113 and the (M−1)-stage cascade connected capacitor circuits 1131, and a second terminal of the output capacitor Co is grounded. Each stage of capacitor circuit 1131 includes a capacitor Cd and a switch component 1132, the switch component 1132 of each stage of capacitor circuit in the (M−1)-stage of capacitor circuits 1131 is controlled, such that, capacitors Cd in the (M−1)-stage od capacitor circuits 1131 are configured to be coupled in parallel to each other and then coupled in parallel with the output capacitor Co, or the capacitors Cd in the (M−1)-stage of capacitor circuits are configured to be coupled in series and then coupled in series with the output capacitor Co.

It should be noted that the explanation of the foregoing embodiment of the wireless charging method is also applicable to the electronic device of this embodiment, which will not be repeated herein.

With the electronic device according to embodiments of the disclosure, in response to the present voltage of the battery being greater than the preset fast charging voltage, the first controller controls the voltage and current adjusting module of the electronic device to operate and adjust the voltage of the adjustable direct current power of the wireless charging apparatus according to the initial voltage value of the adjustable direct current power, thereby, accurately controlling the wireless charging, ensuring that the wireless charging may be completed safely, quickly and efficiently, and realizing the wirelessly fast charging function.

Corresponding to the electronic device of the foregoing embodiments, the present disclosure also provides a wireless charging apparatus.

Referring to FIGS. 10-12, the wireless charging apparatus 200 includes: a voltage conversion module 201, a wireless transmitting module 202, a second communication module 203, and a second controller 204.

The voltage conversion module 201 is configured to perform conversion on an input electrical signal to output an adjustable direct current power. The wireless transmitting module 202 is coupled to the voltage conversion module 201, and configured to convert the adjustable direct current power to an electromagnetic signal and transmit the electromagnetic signal in a wireless manner. The second communication module 203 is communicated with an electronic device 100. The second controller 204 is coupled to the second communication module 203 and the voltage conversion module 201 correspondingly, and configured to receive control information sent by the electronic device 100 through the second controller 204, and control the voltage conversion module 201 according to the control information to match the voltage of the adjustable direct current power with the control information. The control information includes an initial voltage value of the adjustable direct current power, or a step-up adjustment instruction of the adjustable direct current power, or, a step-down adjustment instruction of the adjustable direct current power.

With the wireless charging apparatus according to embodiments of the disclosure, communicated with the electronic device according to the second aspect embodiments, the wireless charging is accurately controlled, the wireless charging may be ensured to complete safely, quickly and efficiently, and the wirelessly fast charging function may be realized.

Figure 15:
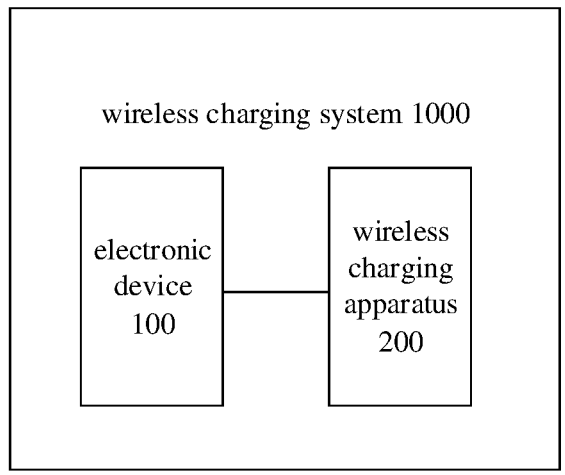
FIG. 15 is a block diagram illustrated a wireless charging system according to embodiments of the present disclosure.
Figure 16:
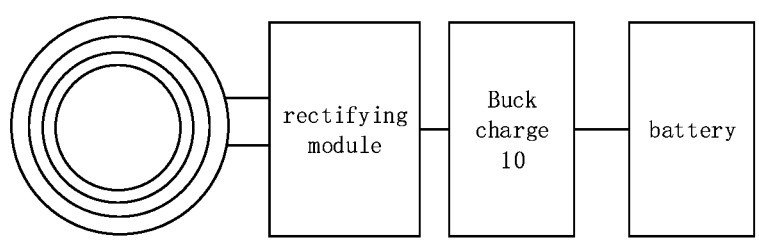
FIG. 16 is a block diagram illustrated wireless charging architecture of the related technologies.

The present disclosure yet provides a wireless charging system. Referring to FIG. 15, the wireless charging system 1000 includes an electronic device 100 and a wireless charging apparatus 200.

With the wireless charging system according to embodiments of the disclosure, through the electronic device according to the second aspect embodiments and the wireless charging apparatus according to the third aspect embodiments, the wireless charging is accurately controlled, the wireless charging may be ensured to complete safely, quickly and efficiently, and the wirelessly fast charging function may be realized.

The present disclosure yet provides a non-transitory computer-readable storage medium having a wireless charging program stored on. When the program is executed by a processor, the program is caused to implement the wireless charging method according to the foregoing embodiments.

In the description of the disclosure, reference throughout this specification to "an embodiment," "some embodiments," "an example," "a specific example," or "some examples," means that a particular feature, structure, material or feature described in connection with the embodiment or example is included in at least one embodiment or example of the disclosure. The appearances of the above phrases throughout this specification are not necessarily referring to the same embodiment or example. Moreover, the particular feature, structure, material or feature described may be combined in any one or more embodiments or examples in a suitable manner. Furthermore, without contradicting each other, the skilled in the art may combine different embodiments or examples described in this specification and features of different embodiments or examples.

In addition, the terms "first" and "second" are only for description purpose, and cannot be understood as indicating or implying relative importance or implicitly indicating the number of indicated technical features. Therefore, the features defined with "first" and "second" can include at least one of the features explicitly or implicitly. In addition, in the description of the disclosure, the term "a plurality of" means two or more, such as two and three, unless specified otherwise.

Any procedure or method described in a flow chart or described herein in other ways may be understood to include one or more modules, segments or portions of codes of executable instructions for achieving specific logical functions or steps in the procedure, and the scope of a preferred embodiment of the disclosure includes other implementations. The order of execution is different from that which is depicted or discussed, including executing functions in a substantially simultaneous manner or in an opposite order according to the related functions, which should be understood by those skilled in the art which embodiments of the disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More detailed examples of the computer readable medium include, but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memory.

It should be understood that each part of the disclosure may be realized by the hardware, software, firmware or their combination. In the above implementations, multiple steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discretely logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above embodiment method may be achieved by commanding the related hardware with a program. The program may be stored in a computer readable storage medium, and the program includes one or a combination of the steps in the method embodiments when operated on a computer.

In addition, each function unit of each embodiment of the disclosure may be integrated in a processing module, or these units may be separate physical existence, or two or more units are integrated in a processing module. The integrated module may be realized in a form of hardware or in a form of software function modules. When the integrated module is realized in the form of software function module and is sold or used as a standalone product, the integrated module may be stored in a computer readable storage medium.

The storage medium mentioned above may be a read-only memory, a magnetic disk or CD, etc. Although embodiments of the disclosure have been shown and described above, it should be understood that the above embodiments are exemplary and should not be construed as limiting the disclosure. The skilled in the art can make changes, modifications, substitutions and variations to the above embodiments within the scope of the disclosure.

What is claimed is:

1. A method for wireless charging, applicable to an electronic device, wherein the electronic device is configured to receive by a wireless receiving module, an electromagnetic signal transmitted by a wireless charging apparatus and to convert the electromagnetic signal to a direct current power, and the method comprises:

monitoring a present voltage of a battery of the electronic device, after communication between the wireless charging apparatus and the electronic device is established;

in response to the present voltage of the battery being greater than a preset fast charging voltage, controlling a voltage and current adjusting module of the electronic device to operate, to perform step-down and current rising on the direct current power outputted by the wireless receiving module of the electronic device and to provide the direct current power after the step-down and current rising to the battery; and determining an initial voltage value of an adjustable direct current power and sending the initial voltage value to the wireless charging apparatus, to enable the wireless charging apparatus to control a voltage of the adjustable direct current power inputted into a wireless transmitting module according to the initial voltage value;

wherein the method further comprises:

after adjusting by the wireless charging apparatus, the voltage of the adjustable direct current power to the initial voltage value:

obtaining a present current of the battery; and generating a step-up adjustment instruction according to the present current of the battery, to enable the wireless charging apparatus to perform step-up adjustment on the adjustable direct current power according to the step-up adjustment instruction;

wherein generating the step-up adjustment instruction according to the present current of the battery comprises:
in response to a difference between a preset charging current and the present current of the battery being greater than or equal to a first preset threshold, generating a step-up adjustment instruction for increasing the voltage of the adjustable direct current power based on a first stepping voltage;
in response to the difference between the preset charging current and the present current of the battery being less than the first preset threshold and the difference between the preset charging current and the present current of the battery being greater than or equal to a second preset threshold, generating a step-up adjustment instruction for increasing the voltage of the adjustable direct current power based on a second stepping voltage; and
in response to the difference between the preset charging current and the present current of the battery being less than the second preset threshold, maintaining the voltage of the adjustable direct current power constant.

2. The method according to claim 1, the determining the initial voltage value of the adjustable direct current power comprising:
determining the initial voltage value according to the present voltage of the battery, wherein the initial voltage value is N times of the present voltage of the battery plus a loss compensation value, N is a conversion factor of the voltage and current adjusting module.

3. The method according to claim 1, further comprising:
after increasing the voltage of the adjustable direct current power based on the second stepping voltage:
monitoring a present voltage of the battery; and
in response to the present voltage of the battery being within a preset range of a preset charging voltage, generating a step-down adjustment instruction based on a third stepping voltage, to enable the wireless charging apparatus to adjust the voltage of the adjustable direct current power according to the step-down adjustment instruction.

4. The method according to claim 3, further comprising:
after adjusting the voltage of the adjustable direct current power according to the step-down adjustment instruction:
monitoring a present current of the battery;
in response to the present current of the battery being less than or equal to a cutoff current, controlling the voltage and current adjusting module to stop operating and controlling a step-down module of the electronic device to operate, to perform step-down on the direct current power outputted by the wireless receiving module and provide the stepped-down direct current power to the battery; and
in response to the present current of the battery being greater than the cutoff current, generating the step-down adjustment instruction for decreasing the voltage of the adjustable direct current power based on a third stepping voltage according to the present voltage of the battery.

5. The method according to claim 1, further comprising:
in response to the communication between the wireless charging apparatus and the electronic device being not established or the present voltage of the battery being less than or equal to the preset fast charging voltage, controlling a step-down module of the electronic device to operate, to perform step-down on the direct current power outputted by the wireless receiving module, and to provide the stepped-down direct current power to the battery.

6. An electronic device, comprising:
a battery;
a wireless receiving module, configured to receive an electromagnetic signal transmitted by a wireless charging apparatus, and to convert the electromagnetic signal to a direct current power;
a voltage and current adjusting module, coupled to the wireless receiving module and the battery respectively, and configured to perform step-down and current rising on the direct current power and to provide the direct current power after the step-down and current rising to the battery;
a first communication module, configured to perform wireless communication with the wireless charging apparatus; and
a first controller, coupled to the first communication module and the voltage and current adjusting module respectively, and configured to monitor a present voltage of a battery after communication between the wireless charging apparatus and the electronic device is established, control the voltage and current adjusting module to operate to perform step-down and current rising on the direct current power outputted by the wireless receiving module in response to the present voltage of the battery being greater than a preset fast charging voltage, and determine an initial voltage value of an adjustable direct current power and send the initial voltage value to the wireless charging apparatus through the first communication module, to enable the wireless charging apparatus to control a voltage of the adjustable direct current power inputted into a wireless transmitting module according to the initial voltage value;
wherein, the first controller is further configured to, after the voltage of the adjustable direct current power is adjusted to the to the initial voltage value by the wireless charging apparatus, obtain a present current of the battery, and generate a step-up adjustment instruction according to the present current of the battery, and send the step-up adjustment instruction to the wireless charging apparatus, to enable the wireless charging apparatus perform step-up adjustment on the adjustable direct current power according to the step-up adjustment instruction;
wherein, the first controller is further configured to:
in response to a difference between a preset charging current and the present current of the battery being greater than or equal to a first preset threshold, generate a step-up adjustment instruction for increasing the voltage of the adjustable direct current power based on a first stepping voltage;
in response to the difference between the preset charging current and the present current of the battery being less than the first preset threshold and the difference between the preset charging current and the present current of the battery being greater than or equal to a second preset threshold, generate a step-up adjustment instruction for increasing the voltage of the adjustable direct current power based on a second stepping voltage; and
in response to the difference between the preset charging current and the present current of the battery being less than the second preset threshold, maintain the voltage of the adjustable direct current power constant.

7. The electronic device according to claim 6, wherein, the first controller is configured to determine the initial voltage value according to the present voltage of the battery, wherein, the initial voltage value is N times of the present voltage of the battery plus a loss compensation value, N is a conversion factor of the voltage and current adjusting module.

8. The electronic device according to claim 6, wherein, the first controller is further configured to, after increasing the voltage of the adjustable direct current power based on the second stepping voltage, monitor a present voltage of the battery, and in response to the present voltage of the battery within a preset range of a preset charging voltage, generate a step-down adjustment instruction based on a third stepping voltage and send the step-down adjustment instruction to the wireless charging apparatus, to enable the wireless charging apparatus to adjust the voltage of the adjustable direct current power according to the step-down adjustment instruction.

9. The electronic device according to claim 8, further comprising:

a step-down module, coupled in parallel with the voltage and current adjusting module, and configured to perform step-down on the direct current power, and to provide the stepped down direct current power to the battery.

10. The electronic device according to claim 9, wherein, the first controller is further configured to:

after adjusting the voltage of the adjustable direct current power according to the step-down adjustment instruction, monitor a present current of the battery;

in response to the present current of the battery being less than or equal to a cutoff current, control the voltage and current adjusting module to stop operating and control a step-down module of the electronic device to operate to perform the step-down on the direct current power outputted by the wireless receiving module; and in response to the present current of the battery being greater than the cutoff current, generate the step-down adjustment instruction based on a third stepping voltage, according to the present voltage of the battery.

11. The electronic device according to claim 9, wherein, the first controller is further configured to, in response to the communication between the wireless charging apparatus and the electronic device being not established or the present voltage of the battery being less than or equal to the preset fast charging voltage, control the step-down module to operate to perform step-down on the direct current power outputted by the wireless receiving module.

12. The electronic device according to claim 6, further comprising:

a load switch, coupled between the voltage and current adjusting module and the battery, wherein the load switch is coupled to the first controller, and the first controller is configured to control the load switch to turn off to stop charging in response to the electronic device having a fault.

13. The electronic device according to claim 6, wherein, the voltage and current adjusting module comprises at least one charge pump unit coupled in parallel or in series, wherein each charge pump unit comprises a first switch, an output capacitor, and a (M−1)-stage cascade connected capacitor circuits, M is an integer greater than 1, a first terminal of the first switch is coupled to an input terminal of the charge pump unit, and a second terminal of the first switch is coupled to the (M−1)-stage cascade connected capacitor circuits, a first terminal of the output capacitor is coupled to an output terminal of the charge pump unit and the (M−1)-stage cascade connected capacitor circuits, and a second terminal of the output capacitor is grounded; and wherein, each stage of capacitor circuit comprises a capacitor and a switch component, and the switch component of each stage of capacitor circuit in the (M−1)-stage of capacitor circuits is controlled, such that capacitors in the (M−1)-stage of capacitor circuits are coupled in parallel to each other and then coupled in parallel with the output capacitor, or the capacitors in the (M−1)-stage of capacitor circuits are coupled in series and then coupled in series with the output capacitor.

14. A wireless charging apparatus, comprising:

a voltage conversion module, configured to perform conversion on an input electrical signal to output an adjustable direct current power;

a wireless transmitting module, coupled to the voltage conversion module, and configured to convert the adjustable direct current power to an electromagnetic signal and transmit the electromagnetic signal in a wireless manner;

a second communication module, communicated with an electronic device; and a second controller, coupled to the second communication module and the voltage conversion module correspondingly, and configured to receive control information sent by the electronic device through the second communication module, and control the voltage conversion module according to the control information to match the voltage of the adjustable direct current power with the control information;

wherein, the control information comprises an initial voltage value of the adjustable direct current power, or a step-up adjustment instruction of the adjustable direct current power, or, a step-down adjustment instruction of the adjustable direct current power;

wherein, in response to a difference between a preset charging current and the present current of the battery being greater than or equal to a first preset threshold, a step-up adjustment instruction for increasing the voltage of the adjustable direct current power is generated based on a first stepping voltage;

in response to the difference between the preset charging current and the present current of the battery being less than the first preset threshold and the difference between the preset charging current and the present current of the battery being greater than or equal to a second preset threshold, a step-up adjustment instruction for increasing the voltage of the adjustable direct current power is generated based on a second stepping voltage; and in response to the difference between the preset charging current and the present current of the battery being less than the second preset threshold, the voltage of the adjustable direct current power constant is maintained.

* * * * *